US012301569B2

(12) United States Patent
Jeuk et al.

(10) Patent No.: US 12,301,569 B2
(45) Date of Patent: May 13, 2025

(54) EXCHANGE ENGINE FOR SECURE ACCESS SERVICE EDGE (SASE) PROVIDER ROAMING

(71) Applicant: Cisco Technology, Inc., San Jose, CA (US)

(72) Inventors: Sebastian Jeuk, Munich (DE); Gonzalo Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 17/976,009

(22) Filed: Oct. 28, 2022

(65) Prior Publication Data

US 2024/0146727 A1 May 2, 2024

(51) Int. Cl.
*H04L 9/40* (2022.01)

(52) U.S. Cl.
CPC ...... *H04L 63/0876* (2013.01); *H04L 63/0263* (2013.01); *H04L 63/20* (2013.01)

(58) Field of Classification Search
CPC ... H04L 63/20; H04L 63/0823; H04L 63/105; H04L 63/10; H04L 41/0894; H04L 67/63
See application file for complete search history.

(56) References Cited

U.S. PATENT DOCUMENTS 11,178,188 B1 11/2021 Wu et al.
2019/0268246 A1* 8/2019 Quintas .................. H04L 63/20
2021/0234860 A1 7/2021 Bansal et al.
2021/0336934 A1 10/2021 Deshmukh et al.
2022/0045987 A1 2/2022 Warburton et al.
2022/0078209 A1 3/2022 V et al.
2022/0103597 A1 3/2022 Gobena et al.

OTHER PUBLICATIONS

MacDonald, Neil et al., "The Future of Network Security Is in the Cloud", published Aug. 30, 2019, Gartner Reprint, retrieved from the internet at <<https:www.gartner.com/doc/reprints?id=1-1OG9EZYB&ct=190903&st=sb>>, 21 pages.

International Search Report and Written Opinion for International Application No. PCT/US2023/077789, mailed Feb. 5, 2024, 14 Pages.

* cited by examiner

*Primary Examiner* — Brian F Shaw
(74) *Attorney, Agent, or Firm* — Lee & Hayes, P.C.

(57) ABSTRACT

Techniques are described herein for implementing and using a secure access service edge (SASE) exchange system to allow SASE providers to share SASE services with other providers. A SASE exchange system may be used by any number of SASE providers to support SASE roaming by user endpoints between different SASE providers. A user endpoint may use SASE roaming to access additional sets of SASE services and capabilities that cannot be provided by a home SASE provider and/or other current SASE provider(s) of the user endpoint. In some examples, a SASE exchange system may be used to transition user endpoints from one SASE provider to another. Additionally or alternatively, the SASE exchange system may determine a combination of SASE providers that can be used to provide different subsets of shared SASE services/capabilities to a user endpoint.

20 Claims, 9 Drawing Sheets

EXCHANGE ENGINE FOR SECURE ACCESS SERVICE EDGE (SASE) PROVIDER ROAMING

TECHNICAL FIELD

The present disclosure relates generally to techniques for aggregating sets of cloud-delivered services to provide security capabilities, network capabilities, and identity/access capabilities that can be used by endpoint devices accessing secure resources. More specifically, this disclosure described techniques for implementing and using an exchange engine for secure access service edge (SASE) providers, allowing SASE providers to share SASE services and allowing endpoint devices to roam between SASE providers.

BACKGROUND

In many contexts and across many various computing architectures, user access applications and other services provided over computing networks. In some instances, the access of these applications and other services may suffer from variations in network capabilities and security performance for various user endpoints accessing the applications and services over various networks. For example, a user may utilize a large corporate environment or leverage virtual private network (VPN) services to access computing resources at a corporate headquarters. These access channels may, for example, be conducted via cloud services over the Internet, via a software-defined networking in a wide area network (SD-WAN) connection from their homes or other locations, and a VPN-less solution on their hand-held devices, among other computer network communication channels or access modalities. Connection times, speeds, and quality of data transmission, among other key performance indicators (KPIs) may vary from user to user depending on factors surrounding the access modality(ies) used by the user endpoint. This situation may result in variations of security, network, and access/identity capabilities, and/or unexpected and undesirable decreases in the quality of service (QoS) experienced by users when interacting with the network and the applications/services provided thereon.

Bypass processes for trusted applications may be employed, where an administrator may bypass certain security functions such as deep packet inspection once performance of the system degrades beyond a defined threshold. Such mechanisms may provide advantages for entirely trusted applications that operate in a central location. However, as the cloud-based systems and data centers that provide resources, as well as the users that access those resources, operate within networks environments of increasing sizes and complexities, the risk also increases that users, applications, systems, and/or networks may be compromised and/or cannot be entirely trusted. Additionally, as the global work force continues to change to a remote work force, various users may access the secure resources of their organization using their own devices, access networks and modalities. In this context, organizations face myriad technical changes in adapting to the increased size and complexity of their remote work forces, especially when any of the various users, endpoint devices, networks, and/or applications may potentially pose a security threat. Further, the ability for organizations to provide consistent policies for security, networking, and access, and to balance those policies with consistent and quality user experiences, may prove difficult in such computing environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
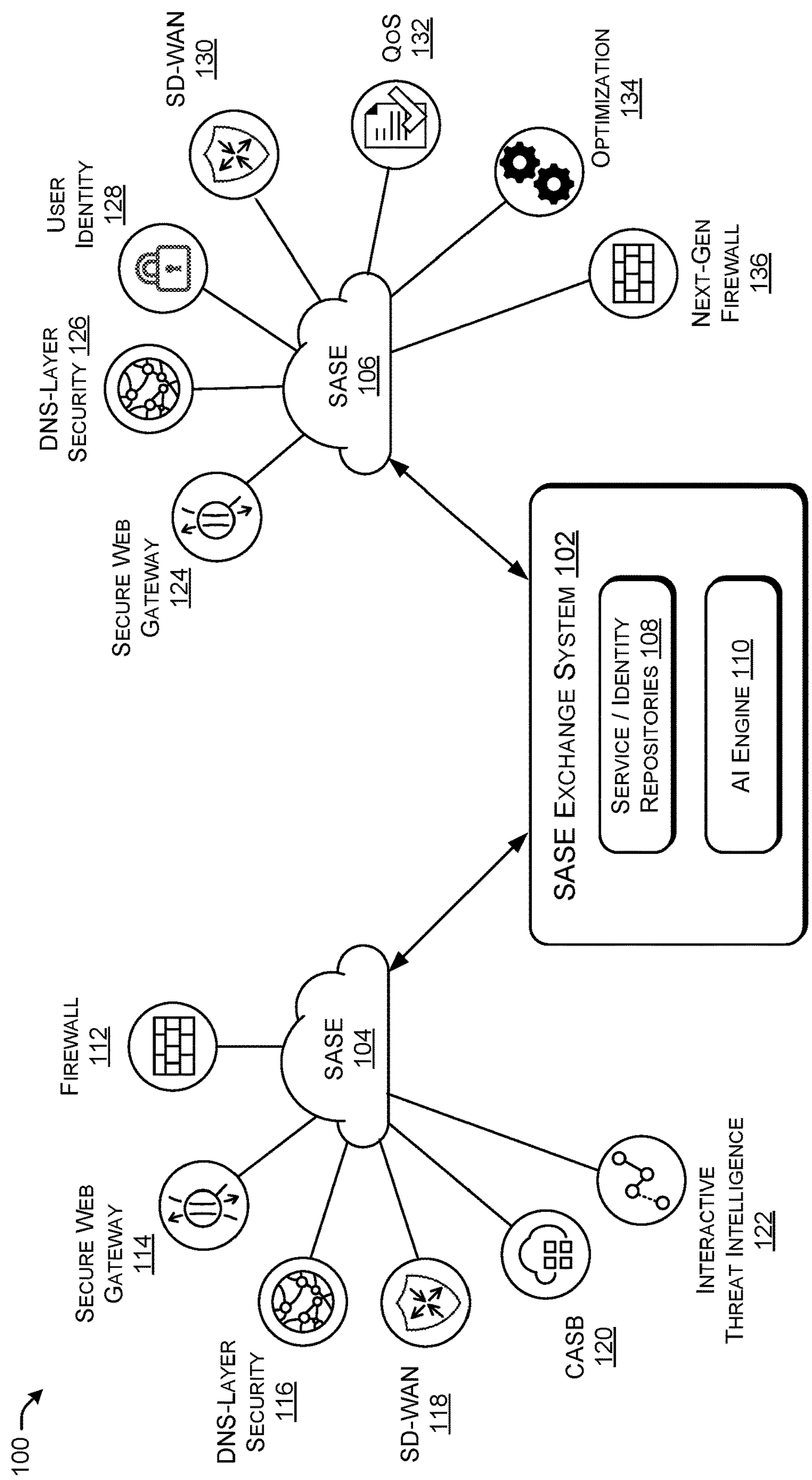
FIG. 1 is an example system-architecture diagram of a computing environment that includes two SASE providers and a SASE exchange system that may be used to implement SASE roaming and service sharing, in accordance with one or more examples described herein.

The present disclosure relates generally to implementing and using an exchange engine for secure access service edge (SASE) providers, allowing SASE providers to share SASE services and/or allowing endpoint devices to roam between SASE providers.

Organizations such as corporations, governmental entities, and educational institutions may provide various communication channels and access modalities to allow users to access the applications and services within their networks. As noted above, complex computing environments that include various endpoint devices, networks, and access modalities may cause disparities in the network and/or security capabilities provided to different users and networks. For example, complex computing environments may include various SASE providers, each of which may be used by user endpoint devices to provide various combinations of SASE services and capabilities to the endpoint devices. Each SASE provider may be associated with a cloud and/or cloud edge, and different user endpoint devices may have particular "home" SASE providers through which they access the network resources of the organization. In such diverse and complex computing environments, it is technically challenging to provide consistent sets of security and networking capabilities via the various SASE providers, and to provide consistent user experiences to the various endpoint devices.

Various techniques described herein include implementing and using a SASE exchange system (which also may be referred to as a SASE exchange engine) to allow SASE providers to share SASE services with other providers and/or to provide the services of other SASE providers to user endpoint devices (which also may be referred to as user endpoints and/or users). Thus, a SASE exchange system may be used by multiple SASE providers to allow user endpoints to "roam" between different SASE providers. In various examples described herein, user endpoints may use SASE roaming to access additional sets of SASE services and capabilities, different from those provided by a home SASE provider and/or the SASE provider(s) used by the current access networks of the user endpoints. In some instances, the SASE exchange system may be used to switch a user endpoint from one SASE provider to another. Additionally or alternatively, the SASE exchange system may determine a combination of SASE providers that can be used to provide different subsets of SASE services/capabilities to a user endpoint.

As described in more detail below, a SASE exchange system may include one or more data repositories including listings of shared SASE services, user identity and authorization data, metadata, etc., associated with the various SASE providers and/or user endpoints. The SASE exchange system also may include an AI engine (or other SASE exchange component) configured to select, based on the data repositories, which SASE providers may be used to provide particular SASE services to user endpoints. As an example, in response to a request from a user endpoint for certain SASE services/capabilities, a first SASE provider may send a request to the SASE exchange system for a second SASE provider capable of providing the requested services/capabilities. In response to the request from the first SASE provider, the SASE exchange system may use execute the AI engine based on the data repositories, to determine a preferred (e.g., optimal) second SASE provider to provide to the requested services/capabilities to the user endpoint. After determining the second SASE provider, the SASE exchange system may respond to both the first and second SASE providers to enable the user endpoint to roam seamlessly from the first to the second SASE provider to access the requested resources.

Before the SASE exchange system receives or responds to requests for SASE service sharing and/or provider roaming, the SASE exchange system initially may receive listings of SASE services and capabilities from the various SASE provider, along with various rules, preferences, and/or metadata that can be used by the AI engine to determine optimal sharing selections. For example, a number of different SASE providers each may initially provide various sharing/roaming data to the SASE exchange system. The sharing/roaming data provided by a SASE provider may include a listing of the SASE services provided by that SASE provider, including the specific capabilities and/or configurations of its SASE services. The SASE providers may use, for example, JAVA files and/or JSON files to indicate their services and capabilities to the SASE example system (or to indicate the services/capabilities that they intend to share). Additionally, each SASE provider also may provide sets of SASE service sharing rules (e.g., rules identifying which SASE services can be shared, with which other SASE providers and/or users endpoint they can be shared, and under what circumstances/conditions they can be shared, etc.), as well as SASE service roaming rules (e.g., rules identifying which user endpoints may be permitted to shared services from a different SASE provider, which services user endpoints may share from the different SASE providers, and/or what circumstances/conditions they can be shared, etc.) to the SASE exchange system. Each of the various SASE providers also may provide the SASE exchange system with a listing of the user identity data, including user identifiers, access data, authorization data, and/or user configuration data, associated with the users and user endpoints registered with the SASE provider. As described in more detail below, when the SASE exchange system selects a sharer SASE provider to share a set of requested SASE services with a sharee SASE provider, it may retrieve the relevant user identity data in the repository from the sharee SASE provider and transmit the user identity data to the sharer SASE provider, to allow the sharer SASE provider to authenticate and handle SASE requests received from the user endpoints.

After receiving and storing the sets of SASE service listings, user identity data, SASE sharing rules, and/or SASE roaming rules from each of the various SASE providers, the SASE exchange system may use this data to determine the compatible (e.g., optimal) SASE providers to share services to allow SASE roaming by the user endpoints. In various examples, the SASE exchange system may receive requests from the SASE providers that have received requests from user endpoints to access particular resources/services on an organization network. When the SASE provider does not include one or more requested SASE capabilities (e.g., SASE access, network, and/or security capabilities) to allow the user endpoint to effectively access the requested resources from the organization network, or when the SASE provider determines that a different SASE provider may be better suited to provide the requested SASE capabilities, then the SASE provider may transmit a SASE sharing request to the SASE exchange system. In response to a SASE sharing request from a SASE provider, the SASE exchange system may the AI engine to determine a different SASE provider that is compatible and/or optimally suited to provide the requested SASE capabilities.

In order to determine the compatible and/or optimal SASE providers from which to share SASE services, the AI engine of the SASE exchange system may use any combination of the SASE provider and/or user endpoint data in the data repository. In some examples, the AI engine may initially query the data repository to determine one or more additional SASE providers that include the requested SASE capabilities. The AI engine also may query and analyze the SASE sharing and SASE roaming rules of the respective SASE providers, to confirm that the requesting SASE provider permits roaming of the requested SASE capabilities with the additional SASE providers, and also that (at least one of) the additional SASE providers permits sharing of the SASE capabilities with the requesting SASE provider. In various examples, the AI engine also may use rules, preferences, and/or metadata associated with the SASE providers, user endpoints, and/or organization resources, to determine which of the additional SASE providers to select to share the SASE capabilities.

After using the AI engine to determine an additional SASE provider to share the requested SASE capabilities, the SASE exchange system may transmit a response to the first SASE provider (e.g., the sharee and/or SASE provider from which the sharing request was received) identifying the second SASE provider (e.g., the sharer and/or SASE provider that may provide the SASE capabilities to the roaming user endpoint). In various examples, IP address forwarding and/or other techniques may be used to provide the first SASE provider with the information identifying the second SASE provider. The first SASE provider then may redirect the request from the user endpoint, or may otherwise provide the user endpoint with the data identifying the second SASE provider, to allow the user endpoint to access the requested SASE capabilities via the second SASE provider. Additionally, the SASE exchange system may provide the second SASE provider with the identity/access data and/or configuration data associated with the user endpoint, so that the second SASE provider can properly receive, authorize, and handle requests from the user endpoint for the shared SASE capabilities. In some examples, the SASE exchange system also may provide additional sharing/roaming rules and preferences, which may be associated with the first SASE provider and/or user endpoint, to the second SASE provider. Such additional sharing/roaming rules and preferences may include general rules and preferences or those that are specific to the shared SASE capabilities, and may be used by the second SASE provider to handle SASE requests from the user endpoint in the manner expected by the user endpoint. In such examples, the SASE roaming may be transparent from the perspective of the applications running on the user endpoint.

As described herein, a SASE exchange system may be implemented in various different ways within the network architecture of the computing environment. In a first example implementation, a SASE exchange system may be deployed in a public cloud environment. In such examples, the SASE exchange system may be configured to enable SASE roaming between any number of independent SASE providers. In a second example implementation, a SASE exchange system may be installed as a container on an edge router of an SD-WAN. In such examples, the SASE exchange system may be contained within a single SASE provider having multiple virtualized providers, each of which may provide various SASE services without owning the full SASE infrastructure, and the SASE exchange system may be used to provide the necessary capabilities to enable roaming between the various virtualized SASE providers. Such implementations also may allow for the reselling of SASE services by customers and partners via the virtualized SASE providers. In a third example implementation, a SASE exchange system may be installed within an enterprise computing infrastructure, such as within an on-premise data center. In such examples, the SASE exchange system may be associated with a local SASE provider, and may function as an extension that allows the local SASE provider to offer additional services that are not available locally. It can be understood that although the different example implementations described herein are distinct, they are not mutually exclusive and can be combined in various ways. Any number of number different SASE exchange systems may be implemented in a computing environment, and the SASE exchange systems may interact with different sets of the SASE providers, the same/overlapping sets of SASE providers, and/or may interact with other SASE exchange systems to manage the SASE sharing and roaming functionality described herein.

Additionally, with the different SASE exchange system implementations described above, various SASE providers and/or user endpoints may interact with a SASE exchange system in any number of different use cases. In some examples, the SASE exchange system may receive requests in response to a user endpoint moving into a different edge network that uses a different SASE provider from the user's "home" SASE provider. In such examples, when the SASE provider associated with the edge network allows SASE roaming, it may transmit a SASE sharing/roaming request to the SASE exchange system. The SASE exchange system may determine that both SASE providers are configured to respectively allow SASE roaming and SASE sharing for the user endpoint, from the SASE provider of the edge network back to the user endpoint's home SASE provider. In other examples, a user endpoint may request SASE services or capabilities that are either not provided by or are not optimal from the SASE provider currently used by the user endpoint. In these examples, the SASE exchange system may determine a different and/or optimal SASE provider to provide the requested SASE services to the user endpoint. As these examples illustrate, in some cases, the SASE exchange system may coordinate with the SASE providers to transfer a user endpoint entirely from one SASE provider to another. In other cases, the SASE exchange system may partially transfer a user endpoint so that the user endpoint receives a particular subset of SASE services from its home SASE provider, and engaged in SASE roaming to receive additional subsets of SASE services from one or more additional SASE providers. As noted above, in some cases, the SASE exchange system might interact only with the various SASE providers, for instance, to receive and respond to SASE service exchange requests. However, in other cases, the SASE exchange system may receive SASE roaming requests and/or additional data (e.g., metadata, roaming rules/preferences, etc.) directly from user endpoints.

As described in these examples and depicted in the figures, the techniques described herein may be implemented within one or more SASE exchange system(s) and/or SASE provider(s). For instance, the examples described herein may include receiving, by a SASE exchange system, a service exchange request from a first SASE provider, the service exchange request including data identifying a requested SASE service and a data identifying an endpoint device, determining, based at least in part on receiving the service exchange request, a first set of SASE service roaming rules associated with the first SASE provider, and a second set of SASE service sharing rules associated with a second SASE provider, determining, based at least in part on the requested SASE service, the endpoint device, the first set of SASE service roaming rules, and the second set of SASE service sharing rules, the second SASE provider to provide the requested SASE service to the endpoint device, providing, to the first SASE provider, a response to the service exchange request, the response including network address data associated with second SASE provider, and providing, to the second SASE provider, the data identifying the endpoint device. Additional examples described herein may receiving, by a first SASE provider and from an endpoint device, a request to utilize a security service, determining that the security service is not provided by the first SASE provider, transmitting, by the first SASE provider, a request to a SASE exchange system, the request including data identifying the security service and the endpoint device, receiving, by the first SASE provider, a response from the SASE exchange system, the response including a network address associated with a second SASE provider capable of providing the security service, and providing the network address to the endpoint device, in response to the request to utilize the security service.

The techniques described herein may be implemented, for example, as methods, non-transitory computer-readable media storing computer-executable instructions, and/or systems comprising processors and non-transitory computer-readable media configured to perform various operations.

EXAMPLE EMBODIMENTS

Referring now to FIG. 1, an example system-architecture diagram is shown of a computing environment 100, including a SASE exchange system 102, a first SASE 104, and a second SASE 106, which may operate in conjunction to implement the SASE service sharing and SASE user endpoint roaming functionality described herein. As shown in this example, the SASE exchange system 102 includes one or more data repositories 108 and an AI engine 110. The data repositories 108 may store various information received from SASEs 104 and 106, and/or user endpoints, including listings of the SASE services/capabilities provided by the SASEs 104 and 106, and identity and authorization data for the users registered with each of the SASEs 104 and 106. In some examples, the data repositories 108 also store various rules and preferences of the SASEs 104 and 106, relating to permitting (or not permitting) sharing their respective SASE services/capabilities with other SASEs, and to permitting (or not permitting) roaming of user endpoints to allow those endpoints to access SASE services/capabilities from other SASEs.

When a service exchange request is received from a first SASE provider, the AI engine 110 may determine, based on the data in the repositories 108, one or more additional SASE providers that are capable of providing the requested SASE services/capabilities to the user endpoint of the first SASE provider. When multiple SASE providers are available to provide the requested SASE services/capabilities, the AI engine 110 may select an optimal SASE provider to share the requested services/capabilities based on the various rules, preferences, and/or metadata associated with the SASE providers and/or the user endpoints.

Although only two SASEs are shown in this example, it can be understood that a SASE exchange system 102 may be configured to interact with any number of different SASE providers providing any number of different SASEs. The different SASEs within the computing environment may include different sets and/or types of SASE services, and thus may provide different identity/access capabilities, network capabilities, and security capabilities that can be used by user endpoints to access the network resources of an organization.

In this example, the SASE 104 and the SASE 106 may include different sets of hardware and software components configured to provide different services and/or capabilities to their respective users. SASE 104 includes components that provide a first set of network and/or security functions, including a firewall 112 service, a secure web gateway (SWG) 114 service, a domain name system (DNS) layer security 116 service, software-defined networking in a wide area network (WAN) (SD-WAN) 118 capabilities, a cloud access security broker (CASB) 120 service, and an interactive threat intelligence (ITI) 122 service. In contrast, SASE 106 may include a different set of hardware and/or software components that provide a first set of network and/or security functions, including a second SWG 124 service, a second DNS layer security 126 service, a user identity 128 service, additional SD-WAN 130 capabilities, a Quality-of-Service (QoS) 132 service, an optimization 134 service, and a next-generation firewall 136 service.

Both the SASE 104 and the SASE 106 in this example may include capabilities provided by a WAN, such as SD-WAN 118 and/or SD-WAN to support any dynamic secure access needs of an organization. In some examples, the capabilities of the SASEs 104 and/or 106 may be delivered as a service (aaS) and may be based upon the identity of the entity, real-time context, enterprise security/compliance policies and continuous assessment of risk/trust throughout the sessions. Identities of entities may be associated with people, groups of people (e.g., branch offices), devices, applications, services, Internet of Things (IoT) systems and/or edge computing locations, among other associations. The SASEs 104 and/or 106 described herein may include client-optimized security edge and/or client-optimized security access functionalities to provide the optimization of a user experience through or via their respective SASE networks. Using the network ecosystem of the SASEs 104 and/or 106, network performance and security intelligence data may be obtained to improve the execution of applications utilized by the user endpoints in accessing the secure resources of the organization.

In some examples, the SASEs 104 and/or 106 may be implemented using the Umbrella™ network security product suite developed by Cisco®. The SASEs 104 and/or 106 may provide a myriad of different identity/access, network, and security capabilities as described in more detail herein. The various security and network services provided by the SASEs 104 and/or 106 may protect users, their respective user endpoint devices, and other computing devices in the environment from malware, botnets, phishing, targeted online attacks, and other security threats that may be encountered within and/or without the environments of the SASEs 104 and/or 106. For instance, other computing devices within the environment 100 may include, for example, one or more private SD-WANs, one or more corporate SD-WANs, various network devices (e.g., laptop computing devices, desktop computing devices, mobile phones, smart phones, tablets, servers, routers, workstations, Internet-of-Things (IoT) devices, etc.), virtual private network (VPN) devices, among a myriad of other computing devices that may be communicatively coupled to one or both of the SASEs 104 and 106.

As shown in this example, one or both of the SASEs 104 and/or may provide domain name system (DNS) layer security services. DNS-layer security services 116 and 126, provided respectively by the SASE 104 and the SASE 106 may include the capabilities to create and enforce security policies related to the execution of the devices behind the network perimeter. The SASEs 104 and/or 106 may include any type of data-driven threat intelligence engine that automatically updates malware, botnet, and phishing domain and IP whitelists and blacklists enforced by the respective SASEs. The intelligence data may be sourced from DNS requests the SASEs 104 and/or 106 receive, and border gateway protocol (BGP) routing tables that are managed by the SASEs network operations center. In this manner, the DNS layer security services 116 and/or 126 may allow for security policies to not only be created and executed for user endpoints and the other computing devices, but also created and executed for the devices within the overall computing environment. Use of security intelligence provided by the DNS layer security services 116 and/or 126 may reduce or eliminates the potential for malicious applications and/or content to be installed or introduced into user endpoints and other computing devices. The security intelligence provided by the DNS layer security services 116 and/or 126 may be used in creating and executing the policies for the devices within communicatively coupled thereto.

Further, in some examples, the SASEs 104 and/or may provide a secure web gateway (SWG) services. For instance, SWG service 114 and SWG service 124 may provide, for example, safe internet access to users who do not use a corporate networks or virtual private networks (VPNs) to connect to remote data centers. SWG services 114 and/or 124 may provide protection against online security threats by enforcing an enterprise's security policies and by filtering malicious Internet traffic. In one example, the malicious Internet traffic may be filtered in real-time. The SWG services 114 and/or 124 may provide uniform resource locator (URL) filtering, application controls for web applications, and the detection and filtering of malicious code. Further, the SWG services 114 and/or 124 may provide data leak prevention services, and/or may inspect web traffic in real-time, analyzing content against corporate policies and ensuring any content that is inappropriate or which contravenes enterprise policy is blocked. Additionally or alternatively, the SWG services 114 and/or 124 may perform any type of file inspection to ensure that the content transmitted via the web traffic is appropriate. In some examples, the SWG services 114 and/or 124 may allow administrators to enforce security policy templates off the shelf and also configure policies that are suited to the corporation's business model and/or compliance requirements. Further, the SWG services 114 and/or 124 may include capabilities to allow roaming users to authenticate seamlessly and to have the same security policies apply to their individual computing devices as if the computing devices were communicatively coupled to the organization's network. The SWG services 114 and/or 124, in this manner, may also be used to protect the various user endpoints and other computing devices in the environment 100. The SWG services 114 and/or 124 also may reduce or eliminate organization data from being leaked to or stolen by a third party by detecting business terms such as payment card industry (PCI) number patterns and phrases or personally identifiable information.

In some examples, the SASEs 104 and/or 106 may also provide a firewall service. For example, the firewall service 112 and or the next-generation firewall service 136 may monitor and control incoming and outgoing network traffic based on a number of predetermined security rules and establishes a barrier between a trusted internal network and untrusted external network, such as the Internet. In this manner, the security capabilities of by the firewall services 112 and/or 136 may be provided to user endpoints and/or other computing devices in the environment 100.

Further, in some cases, a SASE may also include a cloud access security broker (CASB) service. In this example, SASE 104 includes a CASB service 120, which may be any on-premises or cloud-based software that sits between cloud service users and cloud applications and monitors all activity and enforces security policies. The CASB service 120 provides a number of services/capabilities, such as monitoring user activity, warning administrators about potentially hazardous actions, enforcing security policy compliance, and automatically preventing malware, among other activities. The CASB service 120 may deliver security by preventing high-risk events and/or management by monitoring and mitigating the high-risk events. In various examples, the CASB service 120 may utilize application program interfaces (APIs), performance probes, telemetry, and other programming to inspect data and activity in the cloud to alert of risky events after the fact. Further, the CASB service 120 may inspect firewall or proxy logs for usage of cloud applications.

In some cases, SASEs also may include interactive threat intelligence (ITI) services in some examples. For instance, as shown in this example, SASE 104 includes an ITI service 122 configured to provide intelligence associated with the relationships and evolution of internet domains, IPs, and files to assist in pinpointing attackers' infrastructures and predict future threats. Similarly, to the examples described above, the same functions provided by the ITI service 122 in relation to the SASE 104 may similarly applied to user endpoints and/or other computing devices in the environment 100.

In some cases, SASEs may include user identity services and/or capabilities. For instance, SASE 106 includes a user identity service 128 configured to restrict access to resource requests from user endpoints, based on user, device, and/or application identity. For example, the user identity service 128 might be collection processes and/or tools implementing a network access control (NAC) solution to control access to the organization's networks through capabilities such as policy lifecycle management, guest networking access, and security posture checks, etc.

In some examples, SASEs also may include Quality-of-Service (QoS) services and/or capabilities. For instance, SASE 106 includes a QoS service 132 configured to deliver optimal QoS for user endpoints accessing the network resources of the organization. QoS service may include any combination of various QoS features and capabilities, including traffic shaping capabilities, application-aware route selection, bandwidth optimization, and congestion management capabilities. In some cases, the QoS service 132 may monitor and track QoS indicators such as low-latency, jitter, and availability which may reflect a smooth user experience for user endpoints in the SASE environment, may include capabilities to adjust the service delivery parameters to ensure optimal operation of the organization resources.

Additionally or alternatively, SASEs may include optimization services. For instance, SASE 106 includes an optimization service 134 configured to provide centralized orchestration and/or real-time application optimization. For example, based on cloud availability, the optimization service 134 may include capabilities for optimizing performance of applications and hybrid enterprise networks to support and secure users within the environment 100.

Although only a few of the various possible SASE services and capabilities are shown in this example, in other implementations the SASE exchange system 102 may interact with any number of different SASEs, each of which may include any combination of known SASE services and capabilities. Further, as this example illustrates, different SASEs may provide different sets of the services and/or capabilities to user endpoints, which may be used by the endpoints to access the secure networks and resources of the organization. In such examples, a SASE exchange system 102 may provide particular advantages to support user endpoint roaming between different SASEs and/or to allow SASE providers to provide additional services or capabilities that are not included in the SASE.

Figure 2:
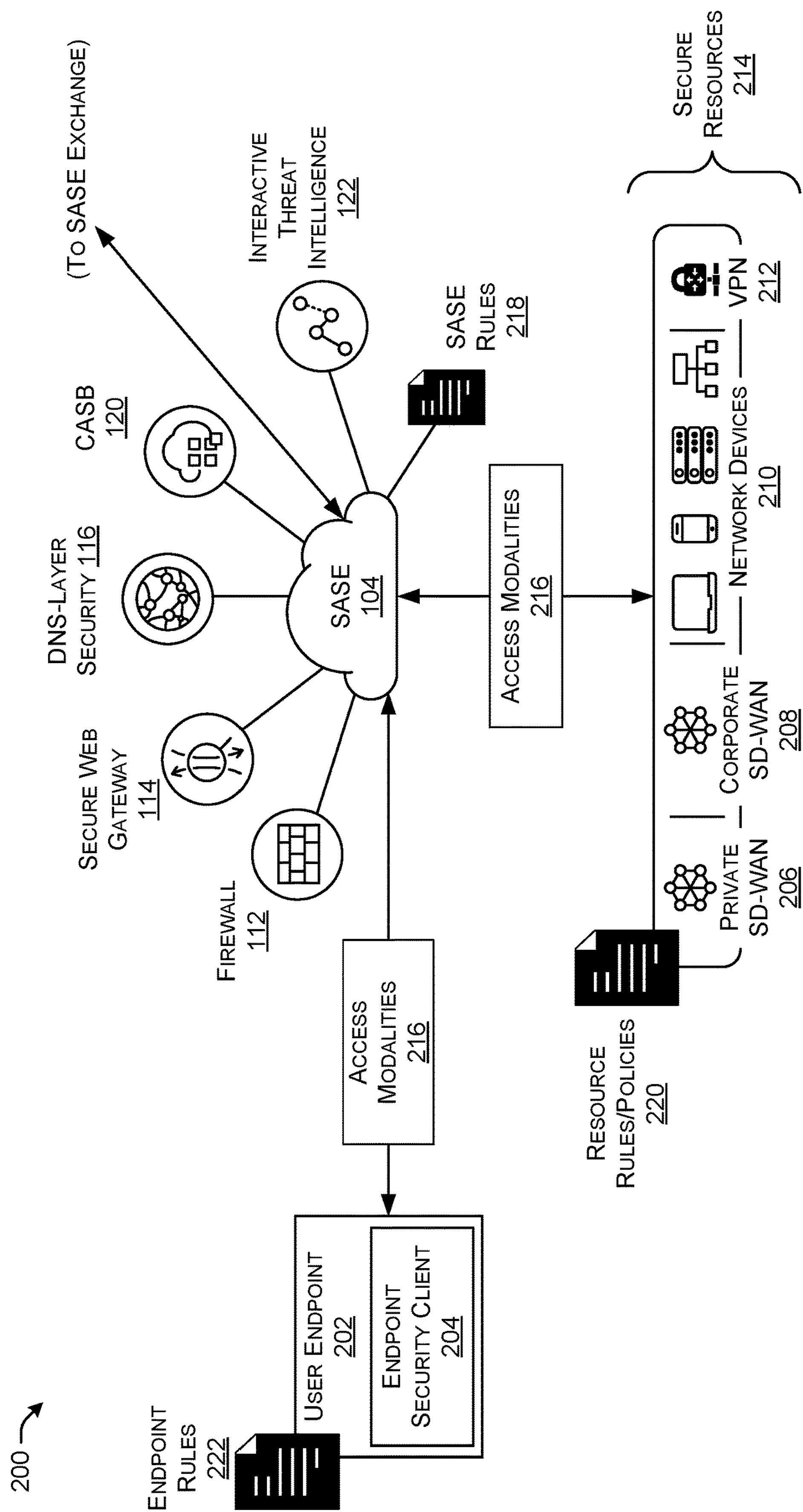
FIG. 2 is another example system-architecture diagram of a computing environment including a SASE provider associated with SASE exchange system, a user endpoint, and resources that may be accessed by the user endpoint, in accordance with one or more examples described herein.

FIG. 2 shows an example diagram of another computing environment 200, in which a user endpoint 202 (or user endpoint device 202) may use various services/capabilities of a SASE 104 to access the secure resources 214 of an organization. In this example, computing environment 200 may represent a scenario in which the user endpoint 202 uses the SASE 104 to access a secure corporate network, internal web pages, and/or other network-based resources of a corporation or other organization. The SASE 104 may provide a requested set of SASE services/capabilities to allow the user endpoint 202 to access the secure resources 214, and/or may use SASE exchange system to determine an additional or alternate SASE that can provide the requested SASE services/capabilities for the user endpoint 202.

In various examples, the user endpoint 202 may be a computing device capable of communicating back and forth with the SASE 104, in order to access applications and/or services of an organization. The user endpoint 202 may include any one of more of a laptop computing device, desktop computing device, mobile phone, smart phone, tablet computer, server, router, workstation, Internet-of-Things (IoT) devices, etc., virtual private network (VPN) devices, among a myriad of other computing devices that may be communicatively coupled to the SASE 104. In some examples, the user endpoint 202 may include an endpoint security client 204 that functions to authenticate and configure routing and encrypt and transport data packets and other network traffic via one of the access modalities 216 (e.g., a private and/or corporate VPN, a DIA, a DNSSEC, a SIG, a SWG, a private and/or corporate SD-WAN, a RAVPN, a S2SVPN, an enterprise head-end network, cellular networks and associated devices, and a cloud network, among other access modalities 216 as described herein). In some examples, the endpoint security client 204 may include the AnyConnect™ endpoint security client 204 developed and distributed by Cisco®.

Although not shown in this example, any or all of the secure resources 214 also may include an endpoint security client 204 that functions to authenticate and configure routing and encrypt and transport data packets and other network traffic, via one of the access modalities 216, to and from the SASE 104 and/or user endpoint(s) 202.

One or both of the user endpoint 202 and/or the endpoint security client 204 may be registered with the SASE 104. As noted above, a user endpoint 202 may be registered with a particular SASE (and/or SASE) provider, or may be registered with multiple SASEs. For the user endpoints 202 registered with a SASE 104, the SASE 104 may determine how to connect the client application on the user endpoint 202 can optimally connect (e.g., most quickly or efficiently, having a fastest or highest quality connection, etc.) to the required SASE services/capabilities for the client application to access the secure resources 214. After a user endpoint 202 is registered with a SASE 104, the user endpoint 202 may request and invoke various SASE services/capabilities of the SASE 104, to access the secure resources 214 of the organization remotely from a separate network. SASE 104 (and/or other SASEs) also may be associated with particular clouds and/or cloud edges.

The various communications described herein that occur between the user endpoint(s) 202 and SASE(s) 104 and/or secure resources 214 may be, for example, conducted via cloud services over the Internet, via a software-defined networking in a wide area network (SD-WAN) connection from their homes or other locations, and a VPN-less solution on their hand-held devices, among other computer network communication channels or access modalities. Examples of access modalities 216 may include a direct internet access (DIA) utilizing, for example, a domain name system security extensions (DNSSEC), private and/or corporate virtual private networks (VPNs), a secure internet gateway (SIG), a secure web gateway (SWG), private and/or corporate SD-WANs of different types including a remote access VPN (RAVPN) and a site-to-site VPN (S2SVPN), an enterprise head-end network, cellular networks and associated devices, and a cloud network, among other access modalities 216 as described herein. The access modalities 216 may also utilize split tunneling where a user may access dissimilar security domains like a public network (e.g., the Internet) and a LAN or WAN at the same time, using the same or different network connections.

The secure resources 214 may represent the secure networks and/or resources of an organization, which the user endpoint 202 may access using SASE 104. When accessing the secure resources 214, the access, security, and/or network capabilities provided by the SASE 104 may protect both the user endpoint 202 and/or the secure resources 214 from malware, botnets, phishing, targeted online attacks, and other security threats that may be encountered within the environment 200. The secure resources 214 may include any device, application, and/or service provided by the organization, such as, one or more private SD-WANs 206, one or more corporate SD-WAN 208, various network devices 210, one or more virtual private network (VPN) devices 212, and myriad other computing devices within the resource workspaces (e.g., data centers, public clouds, private clouds, etc.) of the organization.

In some examples, the user endpoint 202 may indirectly access the secure resources 214 via the SASE 104. Additionally or alternatively, although not depicted in FIG. 2, the user endpoint 202 may initially access the various services/capabilities of the SASE 104, such as identity/access capabilities, network capabilities, and/or security capabilities, after which the user endpoint 202 may use the received SASE capabilities to directly access the secure resources 214.

SASE 104 may include various SASE-related services and capabilities, including a firewall 112 service, a secure web gateway (SWG) 114 service, a domain name system (DNS) layer security 116 service, SD-WAN 118 capabilities, a cloud access security broker (CASB) 120 service, and an interactive threat intelligence (ITI) 122 service. As noted above, these SASE-related services and capabilities are merely examples, and in other examples, the SASE 104 may provide any combination of these or any other SASE services/capabilities. However, when the services/capabilities of the SASE 104 are limited, the SASE 104 may communicate with a SASE exchange system 102 to request additional SASE services/capabilities from another SASE provider (e.g., SASE 106) that the user endpoint 202 can use to access the secure resources 214.

The various techniques used by the SASE exchange system 102, to determine the possible and/or optimal SASE provider(s) to be used by the roaming user endpoint 202, are described more below in reference to FIG. 3. As described below, the SASE exchange system 102 may receive service exchange requests from one of the SASE providers, and may use an AI engine to select the possible (and/or optimal) SASE providers to share SASE services/capabilities in response to the service exchange requests. The AI engine may determine the SASE providers for service sharing and/or user endpoint roaming, based on various data within the repository of the SASE exchange system 102. In some examples, the AI engine may determine optimal SASE providers for SASE sharing/roaming based on sets of rules and/or preferences associated with the various SASEs, various user endpoints, and/or various secure resources of the corporate network.

In this example, the SASE 104 includes a set of SASE rules 218 including the rules and/or preferences of the SASE 104 with respect to SASE sharing/roaming. For example, the SASE rules 218 may include SASE data defining, for each SASE service or capabilities included in the SASE 104, a listing of the additional SASEs that may be permitted to access and use the service or capabilities of the SASE 104. Such a listing may identify the particular set of SASEs with which sharing is permitted, and/or may identifying a set of SASE services/capabilities that may be required of the additional SASEs in order for the SASE 104 to share SASE services with the additional SASE. The SASE rules 218 also may include SASE sharing rules listing(s) of the specific users, SLAs, user endpoints, and/or client applications that may be permitted to use the shared services or capabilities, along with the particular dynamic circumstances (e.g., particular days and/or times during which sharing may be permitted, particular resource usage thresholds, bandwidth thresholds, and/or computing resource thresholds below which sharing may be permitted, etc.) that may determine whether or not the SASE 104 permits sharing in response to a particular service exchange request. In addition to SASE sharing rules, the rules 218 associated with the SASE 104 also may include SASE roaming rules that determine (e.g., conversely to the sharing rules), the listing(s) of users, user endpoints 202, and/or client applications that may be permitted to roam from the SASE 104 to another SASE provider to obtain SASE services/capabilities, the listing(s) of other SASE providers to which SASE roaming may be permitted or not permitted, and the listings of circumstances (e.g., times, load/usage conditions, etc.) during which SASE roaming may or may not be permitted.

Along with various SASE sharing/roaming rules 218 associated with various SASEs, the secure resources 214 of the organization network may, individually or collectively, include rules defining when SASE sharing/roaming is permitted to access the secure resources 214. The resources rules/policies 220 associated with the secure resources 214 may include SASE sharing/roaming rules and policies identifying which SASE providers may share and/or roam SASE services to access the secure resources 214, which user endpoints 202 may roam to additional SASE services to access the secure resources 214, and/or under what circumstances SASE sharing/roaming may be used to allow a user endpoint 202 to access the secure resources 214. Additionally, the endpoint rules 222 may include sets of rules and/or preferences associated with one or more user endpoint(s) 202. The endpoint rules 222 may define when SASE sharing/roaming is permitted and not permitted to allow the user endpoint 202 to access the SASE services/capabilities, the listing of SASE providers with which SASE sharing is permitted for the user endpoint 202, the listing of SASE providers from which SASE roaming is permitted by the user endpoint 202, and/or the circumstances under which SASE sharing/roaming is permitted for the user endpoint 202.

Figure 3:
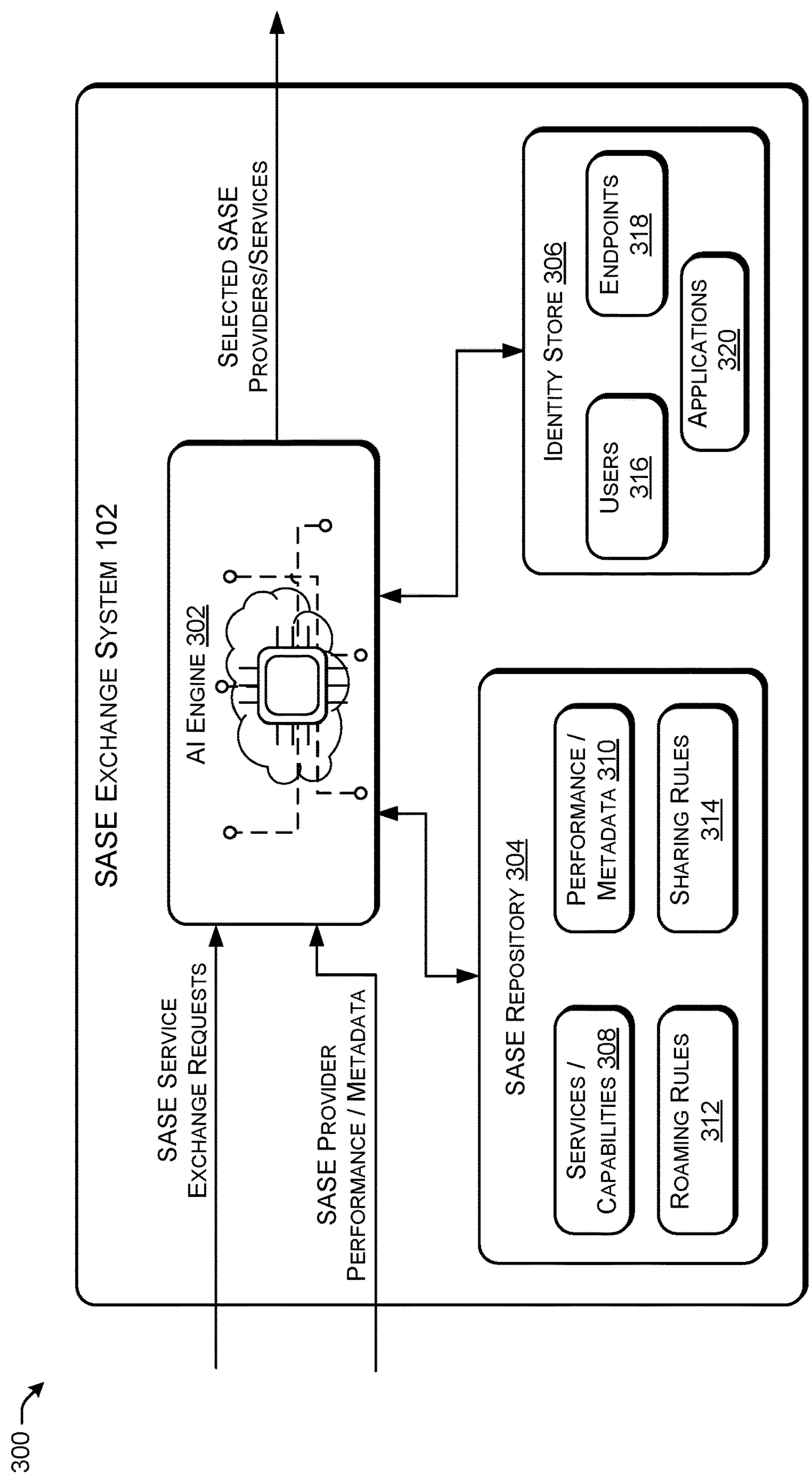
FIG. 3 illustrates a system diagram of an example SASE exchange system, in accordance with one or more examples described herein.

FIG. 3 shows an example system diagram 300 including various components of an example SASE exchange system 102. As shown in this example, the SASE exchange system 102 may include an AI engine 302 configured to determine additional and/or alternative SASE providers to support sharing of SASE services/capabilities and SASE provider roaming by user endpoints. The SASE exchange system 102 in this example also includes a SASE repository 304 and an identity store 306. The SASE repository 304 may include data received from any number of SASEs (which also may be referred to as SASE providers), such as SASEs 104 and 106, described above. For example, the SASE repository 304 may include listings of the SASE services and/or capabilities 308 of each SASE provider, performance and/or metadata 310 associated with each SASE provider, a set of SASE roaming rules 312 associated with each SASE provider, and a set of SASE sharing rules 314 associated with each SASE provider. As described above, the SASE services and/or capabilities 308 may include one or more listings, for each SASE in communication with the SASE exchange system 102, of the various SASE services/capabilities that the SASE includes and/or is potentially able to share with roaming users. Individual SASE providers may, for example, transmit JAVA files and/or JSON files to the SASE exchange system 102 to indicate their services and capabilities. The SASE roaming rules 312 for a SASE provider may include listings of other SASE providers, users, user endpoints, applications, and/or roaming circumstances, etc., under which the SASE provider allows its registered users to roam by sharing services from other SASE providers. Similarly, the SASE sharing rules 314 for a SASE provider may include listings of other SASE providers, users, user endpoints, applications, sharing circumstances, etc., under which the SASE provider allows its own services to be shared by other SASE providers to their roaming users.

Different sets of SASE roaming rules 312 and/or SASE sharing rules 314 can be received from and/or associated with any number of SASEs (e.g., SASE providers) in the computing environment. Additionally, as noted above, different sets of SASE roaming rules 312 and/or SASE sharing rules 314 also may be associated with particular user endpoints 202 (e.g., endpoint rules 222) and/or particular secure resources 214 (e.g., resource rules/policies 222). The SASE repository 304 may use any number of databases to store the various SASE sharing/roaming rules associated with the various SASEs, user endpoints, and/or secure resources.

The performance data and/or metadata 310 may include any number of performance data and/or metadata fields associated with the various SASEs, user endpoints, and/or secure resources in the computing environment. For example, performance data may include the current load data, outages, performance metrics, associated with each SASE provider, and/or the corresponding cloud or cloud edge on which the SASE provider operates. Metadata may include, for example, latency data, bandwidth availability data, utilization data, over-utilization data, geolocation data, etc., for the SASEs, user endpoints, and/or resources in the environment. As described below, the performance data and/or metadata 310 may be used by the AI engine 302, along with the other data in the SASE repository 304, to determine which SASE(s) to select for SASE roaming/sharing arrangements between SASE providers. As an example, the geolocation metadata associated with a first SASE provider may indicate that the first SASE provider is within a particular country or region, and the roaming rules 312 and/or sharing rules 314 of a second SASE provider may indicate that the second SASE provider does not permit sharing SASE services with or from other SASE providers within that country or region (e.g., due to regulations). In this example, the AI engine 302 would determine that the first SASE provider is not to be selected to share services/capabilities with the second SASE provider, or vice versa. Additionally, in some examples, the performance data and/or metadata 310 may be received not just once, but periodically and/or continuously by the SASE exchange system 102. For instance, unlike listings of SASE services/capabilities of a SASE, which may be relatively static, the current performance data (e.g., load, outages, utilization, etc.) associated with a SASE and/or its cloud environment may change relatively quickly. As a result, updated performance data and/or metadata 310 may be received repeatedly at any agreed-upon frequency, and/or in response to changes to this data caused by events within the SASE environments, etc.

The identity store 306 may include identity and/or access data indicating which users 316, user endpoints 318, and/or applications 320 are associated with which SASEs 104 and/or 106 in the computing environment. As noted above, a user may be registered with a particular SASE, or with multiple SASEs, which may allow the SASE(s) to determine how to best connect the user to any required SASE services/capabilities. In various examples, such registrations with SASEs may be associated with particular users, user endpoints, and/or applications. Similarly, different secure resources 214 (e.g., devices, services, and/or applications) also may be registered with particular SASEs 104 and/or 106, so that the SASE(s) may determine how to best connect users to the particular secure resources 214. In various examples, the SASE exchange system 102 may receive the data in the identity store 306 directly from SASE providers 104 and/or 106, from user endpoints 202 (e.g., directly or indirectly via a SASE), and/or from secure resources 214 (e.g., directly or indirectly via a SASE).

Additionally or alternatively, the identity store 306 may include operating parameters and/or configuration details relating to how SASEs provide particular services and/or capabilities to different users 316, user endpoints 318, and/or applications 320. As an example, an SD-WAN of SASE 104 may use a first technique for forwarding traffic, while an SD-WAN of SASE 106 may use a different second technique for forwarding traffic. These SASE-specific techniques may be applied to all users/endpoints/applications registered with the SASE, or a SASE may have different techniques for different registered users, endpoints, and/or applications. These various techniques (e.g., traffic forwarding by the SD-WAN, and/or other SASE-specific configurations of the various SASE services) may be stored in the identity store 306, so that when SASE sharing occurs, the new SASE selected to provide the services to a user endpoint can provide those services in the same expected manner as the home SASE of the user endpoint.

After the SASE exchange system 102 receives and stores the various data described above (e.g., listings of SASE capabilities, SASE sharing/roaming rules and preferences, user identity and access data, performance and metadata, etc.) has been received and stored in the various data stores of the SASE exchange system 102, the SASE exchange system 102 may be configured to receive and respond to SASE service exchange requests from any of the SASE providers. As described above, a service exchange request from a SASE 104 may include one or more SASE services/capabilities that have been requested of the SASE 104 from a user endpoint 202, and that the SASE 104 is unable to provide. In some examples, a service exchange requests from a SASE 104 may simply identify the SASE services/capabilities that the SASE 104 is unable to provide. In other examples, the service exchange requests also may identify the particular user endpoint(s) 202 and/or application requesting the SASE services/capabilities. Additionally or alternatively, a service exchange request may identify the particular secure resources 214 of the organization that a user endpoint 202 intends to access, using the SASE services/capabilities, and/or any additional configuration data regarding how the user endpoint 202 intends to use the requested SASE services/capabilities or the secure corporate resources 214.

Further, in some cases, a SASE provider 104 may send a service exchange request to the SASE exchange system 102 when it is unable to provide a SASE service. In other cases, the SASE provider 104 may send service exchange requests even when it is able to provide a requested SASE service/capability, if it determines that it may be a suboptimal SASE provider for the particular user endpoint 202 and/or requested SASE service. For instance, if a SASE provider 104 receives a request from a user endpoint 202 that has not previously been registered, the SASE provider 104 may send a service exchange request to the SASE exchange system 102 so that the home SASE provider of the user endpoint 202 can be determined and the user endpoint 202 can be transferred to the home SASE provider. As another example, if the SASE provider 104 determines that it includes a possible but suboptimal SASE service (e.g., an older firewall version, different SD-WAN configuration, etc.) to handle the request by the user endpoint 202, then the SASE provider 104 may send a service exchange request to the SASE exchange system 102, to allow the SASE exchange system 102 to determine a better SASE provider 104 to handle the request from the user endpoint 202.

When the SASE exchange system 102 receives a service exchange request from a first SASE provider (e.g., SASE 104), the SASE exchange system 102 may use the AI engine 302 to analyze the data in the repositories and/or additional data (e.g., current system performance data, metadata, results of previous SASE sharing/roaming arrangements, etc.), and to determine a second SASE provider (e.g., SASE 106) to provide the requested SASE services/capabilities. In various examples, the AI engine 302 may initially determine, based on the services and capabilities 308 listings, a subset of the SASE providers include the requested SASE capabilities. Then, the AI engine 302 may analyze the rules and preferences for SASE sharing/roaming of the first SASE provider, the subset of SASE providers able to provide the requested SASE services/capabilities, and/or the user endpoint 202 requesting the SASE services/capabilities from the first SASE provider. Additionally or alternatively, the AI engine 302 may analyze the performance data and/or metadata associated with the SASE providers, user endpoints, secure resources 214 and/or other components in the computing environment.

Based on the analysis of the various repository data stored in the SASE exchange system 102, and/or additional data retrieved from external sources (e.g., current performance data, historical SASE sharing/roaming data, etc.). The AI engine 302 may determine a second different SASE provider (e.g., SASE 106) to provide the requested SASE services/capabilities. In some examples, the AI engine 302 may perform a cost-based optimization based on the various rules and preferences of the different SASE providers, user endpoints, resources, etc. For instance, various cost factors such as compliance or non-compliance with sharing and roaming preferences of different SASE providers, compliance or non-compliance with service level agreements, the level performance and compatibility between SASE services and various applications, cost/pricing factors associated with different SASE providers, the current performance data for different SASE providers, and the like, each may be assigned different cost values. The AI engine 302 may sum the cost values for each SASE provider that is able to share the requested SASE services/capabilities, to determine an optimal (e.g., lowest cost) SASE provider. Additionally, some or all of the cost factors for a cost-based determination, such as SASE performance, SASE service-application compatibility, etc., may have different costs at different days, different times of day, different cloud utilization conditions, etc. In such examples, the AI engine 302 may initially determine the costs based on the current day/time, current cloud load or utilization conditions, current network traffic, etc., and then compute the lowest-cost SASE provider to share the requested services/capabilities.

In some examples, the AI engine 302 may output a single (e.g., optimal) second SASE provider (e.g., SASE 106) to provide the SASE services/capabilities requested by the first SASE provider (e.g., SASE 104). In other examples, the AI engine 302 may determine and output multiple possible SASE providers that could provide the requested SASE services/capabilities (e.g., a ranked list of compatible SASE providers). In such examples, the SASE exchange system 102 can provide a listing (e.g., ranked or not) multiple compatible SASE providers back to the first SASE provider from which the request was received, to allow the first SASE provider to select the SASE providers from which it may share the requested services/capabilities.

After the AI engine 302 determines an additional SASE provider (or multiple additional SASE providers) that can share the requested SASE services/capabilities with the first SASE provider, the SASE exchange system 102 may communicate with both the requesting SASE provider (e.g., SASE 104) and the selected sharing SASE provider (e.g., SASE 106) to allow the SASE sharing and user endpoint SASE roaming to occur. For example, the SASE exchange system 102 may transmit a response to the service exchange request from the SASE 104, indicating the network address of the other SASE provider selected to provide the requested services/capabilities. For instance, the SASE exchange system 102 may use IP address forwarding and/or other techniques to provide the first SASE provider with identifying information to allow it to communicate with the selected SASE provider (and/or to pass on the identifying information to its user endpoint(s) 202). In some cases, the first SASE provider then may use the address of the selected SASE provider to redirect requests from the user endpoint 202.

Additionally, the SASE exchange system 102 may communicate with the second SASE provider (e.g., SASE 106) selected to provide the requested SASE services/capabilities. For instance, the SASE exchange system 102 may provide the second SASE provider with the user identity/access data for the user endpoint 202 that requested the SASE services/capabilities from the first SASE provider. By receiving the user identity/access data, the second SASE provider may be able to receive, authorize, and handle requests from the user endpoint 202. In some cases, the SASE exchange system 102 also may provide service configuration data, preferences, etc., of the user endpoint 202, to the second SASE provider, to allow the user endpoint 202 to roam transparently and/or seamlessly to the second SASE provider to access the requested SASE services.

Although not shown in this example, in some instances the SASE exchange system 102 may include a monitoring and feedback mechanism for SASE sharing and user endpoint SASE roaming. For instance, after the AI engine 302 selects a sharing SASE provider to share services with one or more user endpoints 202 (e.g., in response to a request from a requesting SASE provider unable to provide the requested SASE service), the SASE exchange system 102 may track and monitor the performance of the sharing SASE provider in handling SASE service requests from the user endpoint(s) 202. When the SASE exchange system 102 determines, based on the monitoring, that the sharing SASE provider handled the requests quickly and efficiently and the user experience was not negatively impacted for the user endpoint(s) 202, the SASE exchange system 102 may store this positive feedback in the data repositories. Positive feedback from a previous SASE sharing/roaming arrangement between SASE providers may cause the AI engine 302 to positively weight the selected sharing SASE provider, making it more likely that the same sharing SASE provider will be selected to handle subsequent service exchange requests. Conversely, when the SASE exchange system 102 determines that the sharing SASE provider did not handle the requests quickly and efficiently, and/or that the user experience was negatively impacted, the SASE exchange system 102 may store this negative feedback in the data repositories. Negative feedback from a previous SASE sharing/roaming arrangement between SASE providers may cause the AI engine 302 to negatively weight the selected sharing SASE provider, making it less likely that the same sharing SASE provider will be selected to handle subsequent service exchange requests.

Figure 4:
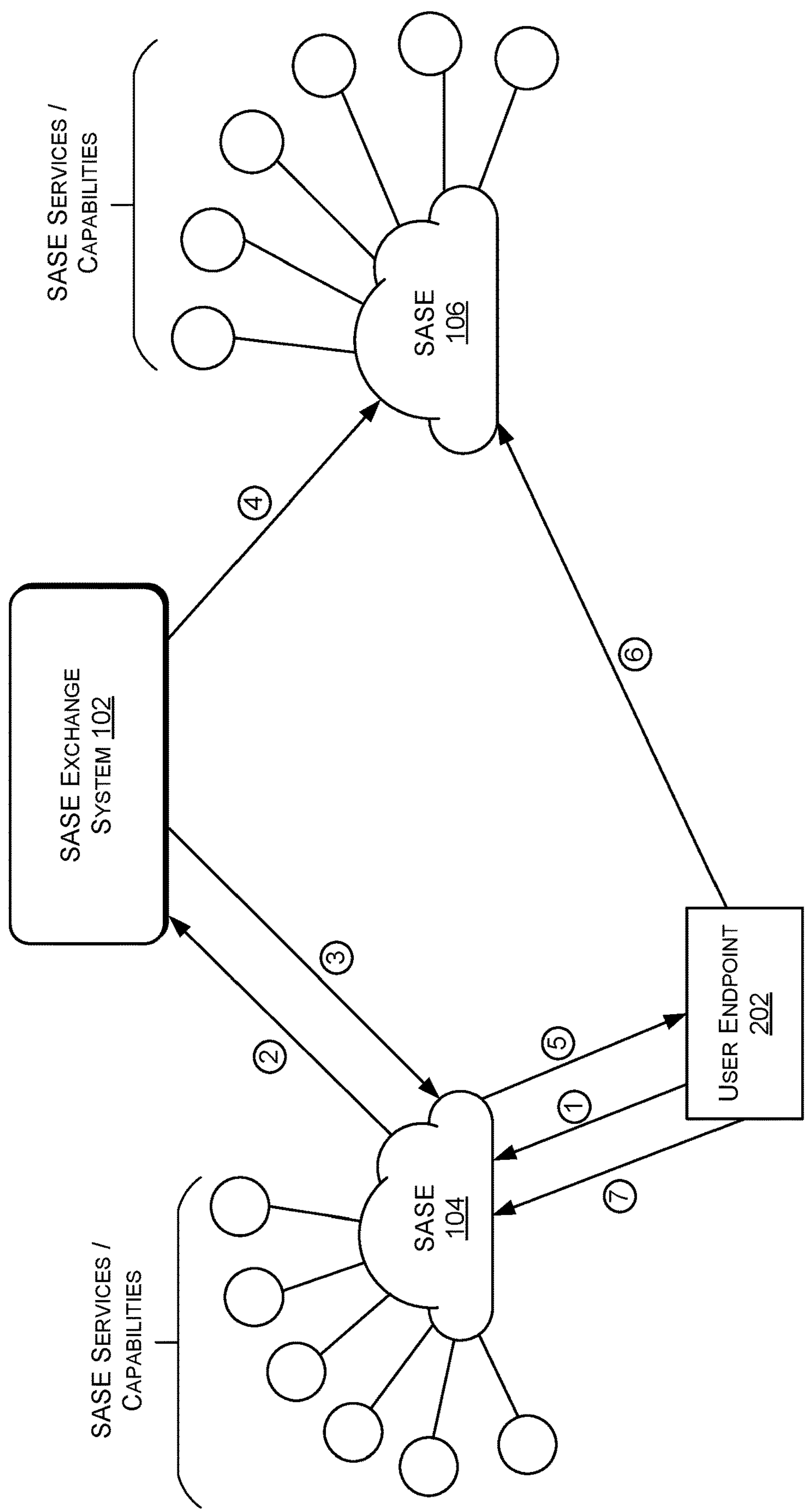
FIG. 4 illustrates an example computing environment in which SASE services are shared between a SASE providers using a SASE exchange system, in accordance with one or more examples described herein.
Figure 5:
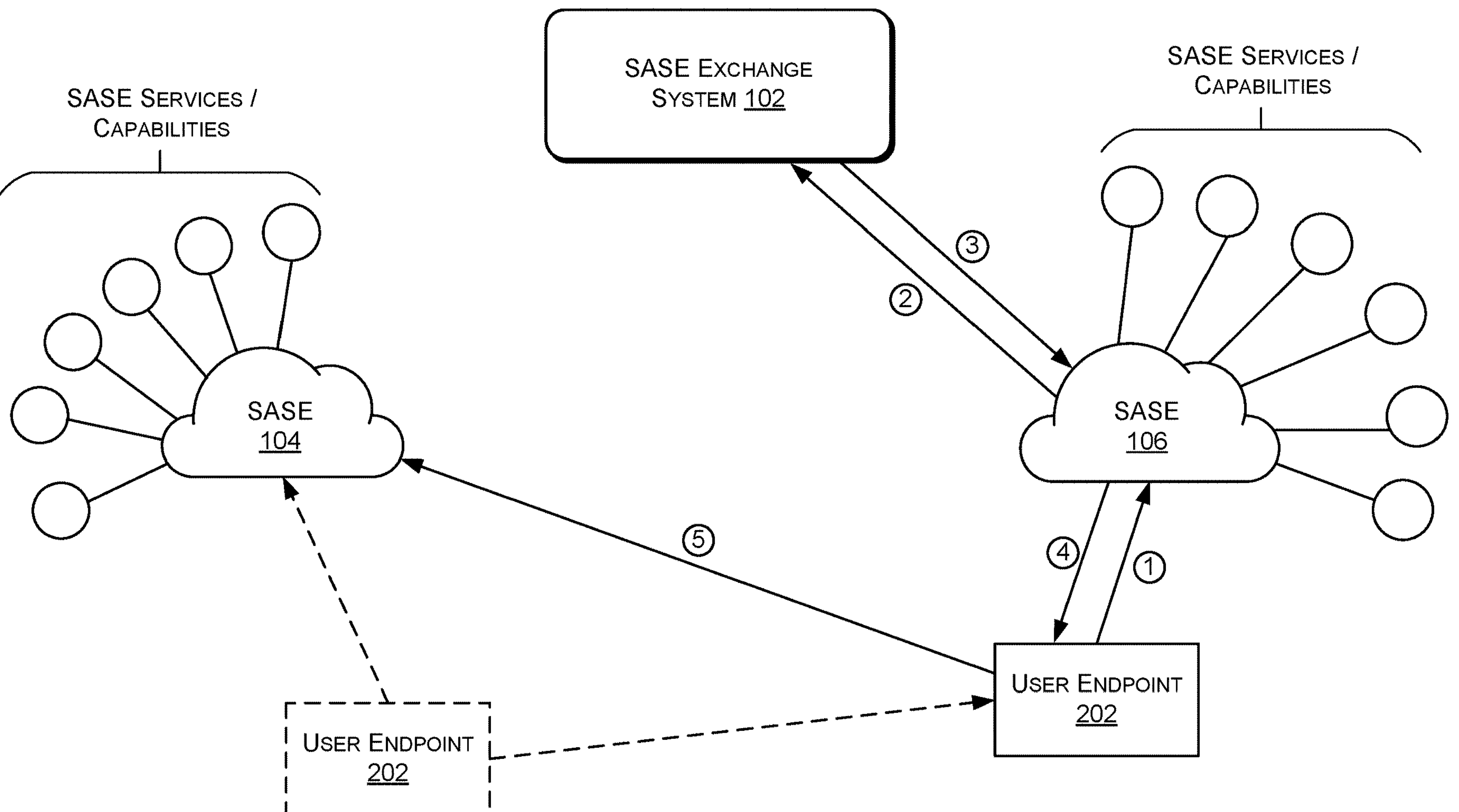
FIG. 5 illustrates an example computing environment in which a user endpoint roams between SASE providers sharing SASE services, in accordance with one or more examples described herein.

Referring now to FIG. 4 and FIG. 5, two different examples are shown of use cases in which a SASE provider may request sharing of SASE services/capabilities from a SASE exchange system 102, after which a user endpoint 202 may engage in SASE service roaming by requesting/receiving SASE service/capabilities from a different SASE provider.

For example, FIG. 4 depicts a use case in which the user endpoint 202 requests SASE services and/or capabilities from a SASE 104, that the SASE 104 is unable to provide. In response, the SASE 104 uses the SASE exchange system 102 to determine a different SASE 106 that is able to provide the requests SASE services/capabilities to the user endpoint 202, allowing the user endpoint 202 to roam to the SASE 106 to access the requests SASE services/capabilities.

In this example, at step 1 in FIG. 4, the user endpoint 202 requests SASE services/capabilities from a first SASE 104 (e.g., a home SASE at which the user endpoint 202 is registered). The request may correspond to, for instance, the user endpoint 202 opening a secure application and/or attempting to access a corporate network, internal web pages, and/or other network-based resources of an organization. At step 2, the SASE 104 determines that it is not able to provide the requested SASE services/capabilities to the user endpoint 202, and transmits a service exchange request to the SASE exchange system 102. In response to the request, the SASE exchange system 102 may determine (e.g., using the AI engine 302 as described above) a second SASE 106 to provide the requested SASE services/capabilities to the user endpoint 202. At step 3, the SASE exchange system 102 transmits a response back to the SASE 104 identifying the SASE 106 as an additional/alternative SASE provider from which the user endpoint 202 can access the requested services/capabilities. At step 4, the SASE exchange system 102 also transmits data to the SASE 106 including the identity data, access data, and/or configuration data associated with the user endpoint 202, to allow the SASE 106 to efficiently handle SASE requests from the user endpoint 202. At step 5, the SASE 104 provides the user endpoint 202 with information identifying the SASE 106 (e.g., using IP address forwarding, redirects, etc.). At step 6, the user endpoint 202 requests the SASE services/capabilities from the SASE 106. Finally, at step 7, the user endpoint 202 may continue to request additional SASE services/capabilities from the first SASE 104 (e.g., its home SASE provider).

FIG. 5 depicts a second use case in which the user endpoint 202 moves from a first network associated with the first SASE 104 (e.g., its home SASE provider), to a different network associated with the second SASE 106. As noted above, in some examples different SASEs may be associated with and may operate on different clouds and/or different cloud edges. In such examples, the movement of the user endpoint 202 from a home network to a different access network (e.g., remote working LAN, telecom hotspot, etc.), may cause the user endpoint 202 to request any SASE services/capabilities from the SASE provider of the new network.

In this example, at step 1 in FIG. 5, the user endpoint 202 has connected to a new network and requests SASE services/capabilities from a new SASE 106 associated with the new network. As in the previous example, the request may correspond to the user endpoint 202 opening a secure application and/or attempting to access a corporate network, internal web pages, and/or other network-based resources of an organization. At step 2, the SASE 106 determine that it is not able to provide the requested SASE services/capabilities to the user endpoint 202 and/or that it not the home SASE for the user endpoint 202, and thus transmits a service exchange request to the SASE exchange system 102. In response to the request, the SASE exchange system 102 may determine (e.g., using the AI engine 302 as described above) that the SASE 104 is the home SASE provider of the user endpoint 202, and that SASE 106 permits roaming by the user endpoint 202 back to its home SASE 104. At step 3, the SASE exchange system 102 transmits a response back to the SASE 106 identifying the SASE 104 as the home SASE provider for the user endpoint 202. At step 4, the SASE 106 provides the user endpoint 202 with information identifying its home SASE 104 (e.g., using IP address forwarding, redirects, etc.). At step 5, the user endpoint 202 requests any number of SASE services/capabilities from its home SASE 104. In this example, unlike the previous example, the user endpoint 202 may be configured to receive all SASE services/capabilities from its home SASE provider. In other examples, as discussed above, the user endpoint 202 may receive different subsets of SASE services/capabilities from different SASE providers.

Figure 6:
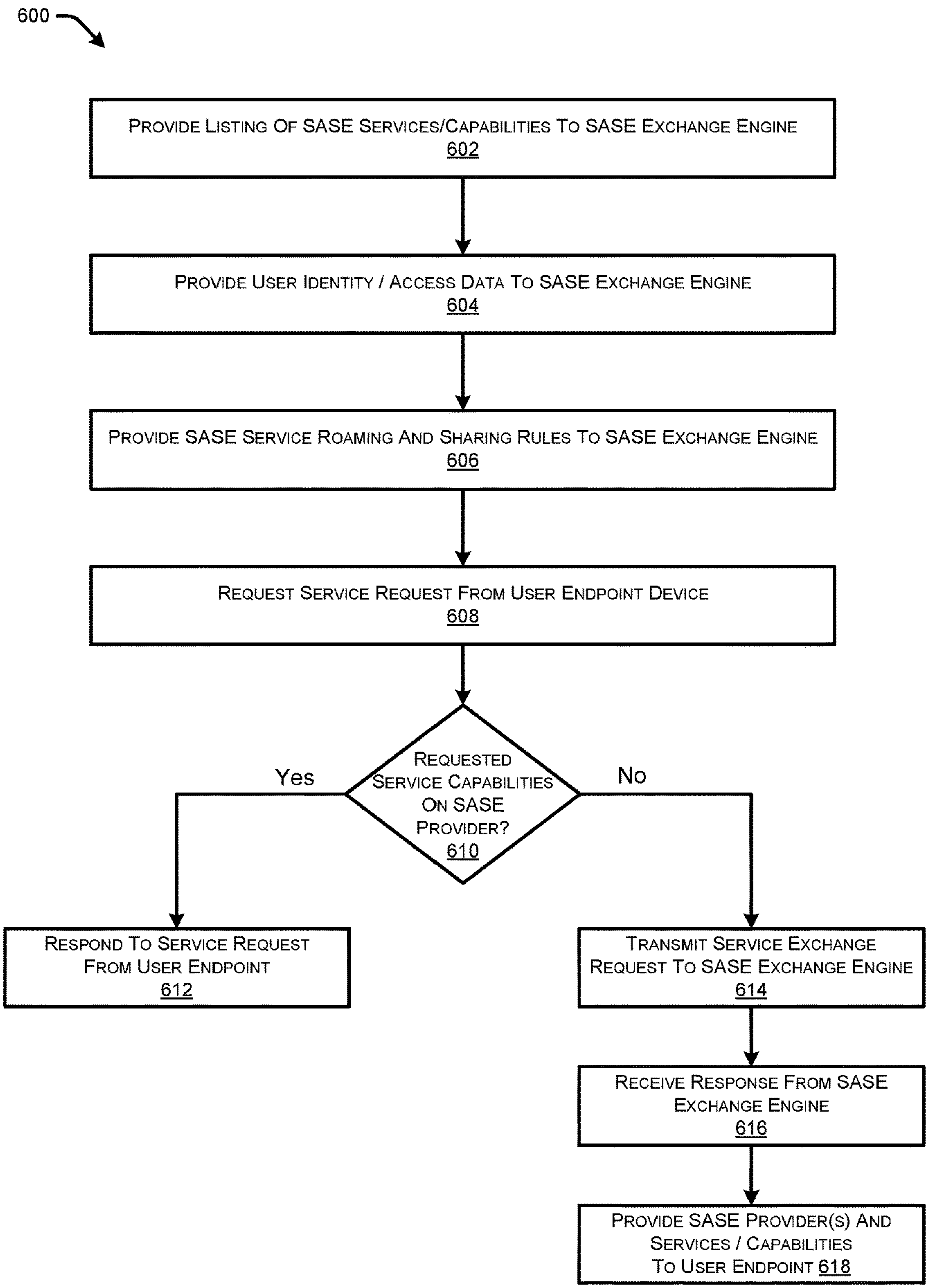
FIG. 6 is a flow diagram illustrating an example process for a SASE provider to access a SASE exchange system for sharing SASE services, in accordance with one or more examples described herein.

FIG. 6 is a flow diagram of an example process 600 for a SASE provider to access a SASE exchange system in connection with sharing SASE services and supporting SASE provider roaming by user endpoints. As described below, the operations in process 600 may be performed by a SASE provider configured to receive and handle requests for SASE services from user endpoint devices. In particular, the techniques described in process 600 may be applied by a system comprising one or more processors, and one or more non-transitory computer-readable media storing computer-executable instructions that, when executed by the one or more processors, cause the one or more processors to perform operations of method 600.

The implementation of the various components described herein is a matter of choice dependent on the performance and other requirements of the computing system. Accordingly, the logical operations described in connection with FIG. 6 (and/or FIG. 7 discussed below) are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and/or FIG. 7, and described herein. These operations can also be performed in parallel, or in a different order than those described herein. At least a portion of these operations can also be performed by any suitable components and/or as may become apparent to one skilled in the art. Although the techniques described in this disclosure is with reference to specific components, in other examples, the techniques may be implemented by fewer components, more components, and/or different components.

At operation 602, a first SASE provider (e.g., SASE 104) may provide a listing of the SASE services/capabilities included in the SASE 104, to the SASE exchange system 102. For example, the SASE 104 may provide one or more listings to the SASE exchange system 102, including the various SASE services/capabilities include in the SASE 104 and/or that the SASE 104 may potentially be able to share with other SASEs to support roaming users, etc.

At operation 604, the first SASE 104 also may provide user identity and/or access data to the SASE exchange system 102. The user identity and/or access data may include identifying which users, user endpoints, and/or applications are associated with the SASE 104. As noted above, various users/user endpoints may be registered with the SASE 104, and the SASE 104 may store configuration data allows the SASE 104 to connect the user/user endpoint quickly and efficiently to its SASE services/capabilities, having minimal impact on user experience. In some examples, any or all of the configuration data associated with the registered users, user endpoints, and/or applications also may be provided to the SASE exchange system 102 in operation 604.

At operation 606, the SASE 104 provide any number of SASE service sharing and/or SASE roaming rules to the SASE exchange system 102. In some examples, SASE roaming rules for the SASE 104 may include various listings of other SASE providers, users, user endpoints, applications, and/or circumstances (e.g., times, days, current network conditions, computing environment performance, etc.) under which the SASE 104 may allow users to roam by sharing services from other SASE providers. Similarly, SASE sharing rules from the SASE 104 may include listings of other SASE providers, users, user endpoints, applications, sharing circumstances, etc., under which the SASE 104 may allow its own services/capabilities to be shared by other SASE providers to their roaming users. Further, in some examples, the SASE 104 may have additional sharing/roaming preferences, that might not be required by SASE 104 to engage in a SASE services sharing arrangement, but may be preferred by the SASE 104. In some cases, the sharing/roaming preferences of the SASE 104 may have associated cost values that the SASE exchange system 102 can use when determining an optimal/lowest-cost SASE service sharing arrangement.

As discussed herein, operations 602-606 can be performed by any number of SASE providers (e.g., SASE 104, SASE 106, . . . , etc.), and the SASE exchange system 102 may receive and store the various SASE service listings, sharing/roaming rules and preferences, user identity/access data from each of the various SASE providers.

At operation 608, the first SASE 104 may receive a request from a user endpoint (e.g., user endpoint 202) to access a set of SASE services/capabilities. The request may correspond to, for example, the user endpoint 202 opening a secure application and/or attempting to access secure resources 214 (e.g., a corporate network, internal web pages, and/or other network-based resources of an organization). As discussed above, various SASE services/capabilities may be needed by the user endpoint 202 before the secure resources 214 can be accessed. In some instances, the SASE 104 may be a home SASE provider of the user endpoint 202 from which the request is received in operation 608. In other cases, the request may be received from a new/roaming user endpoint 202 that is not registered with and/or has not previously interacted with the SASE 104.

At operation 610, the first SASE 104 may determine whether it can provide the services/capabilities requested by the user endpoint 202. If the SASE 104 can provide the requested SASE services/capabilities (610:Yes), then at operation 612 the SASE 104 provides those services/capabilities, allowing the user endpoint 202 to access the secure resources 214 of the organization.

However, if the SASE 104 is unable to provide the requested SASE services/capabilities (610:No), then at operation 614 the SASE 104 may transmit a service exchange request to the SASE exchange system 102. As described above, the service exchange request from the SASE 104 may identify the SASE services/capabilities requested by the user endpoint 202 that the SASE 104 is unable to provide. In some cases, the SASE 104 may directly provide a portion of the requested SASE services/capabilities to the user endpoint 202, but may send a request to the SASE exchange system 102 to find a different SASE provider capable of providing the other portion(s) of the requested SASE services/capabilities. In some examples, the service exchange request from the SASE 104 also may identify the user endpoint 202 and/or application requesting the SASE services/capabilities.

At operation 616, first SASE 104 may receive a response from the SASE exchange system 102 including data identifying a second SASE provider (e.g., SASE 106) that can provide the requested SASE services/capabilities, and is configured to share the requested services/capabilities with the user endpoint 202. In some examples, the response received may include an IP address (and/or other network identifiers) for one or more additional SASEs that can be used to provide the requested services/capabilities.

At operation 618, the first SASE 104 may provide the data identifying the second SASE provider(s) to the user endpoint 202. In some examples, SASE sharing between providers and/or user endpoint SASE roaming may be multilateral, where the SASE exchange system 102 may determine multiple different SASE providers to provide different combinations of SASE services/capabilities to the user endpoint 202. In such cases, the SASE exchange system 102 may provide to the SASE 104 (in operation 616), and the SASE 104 may provide to the user endpoint (in operation 618), networks address or identifying information for multiple additional SASEs, along with data indicating the particular SASE services/capabilities that each additional SASE is to provide to the user endpoint 202.

Figure 7:
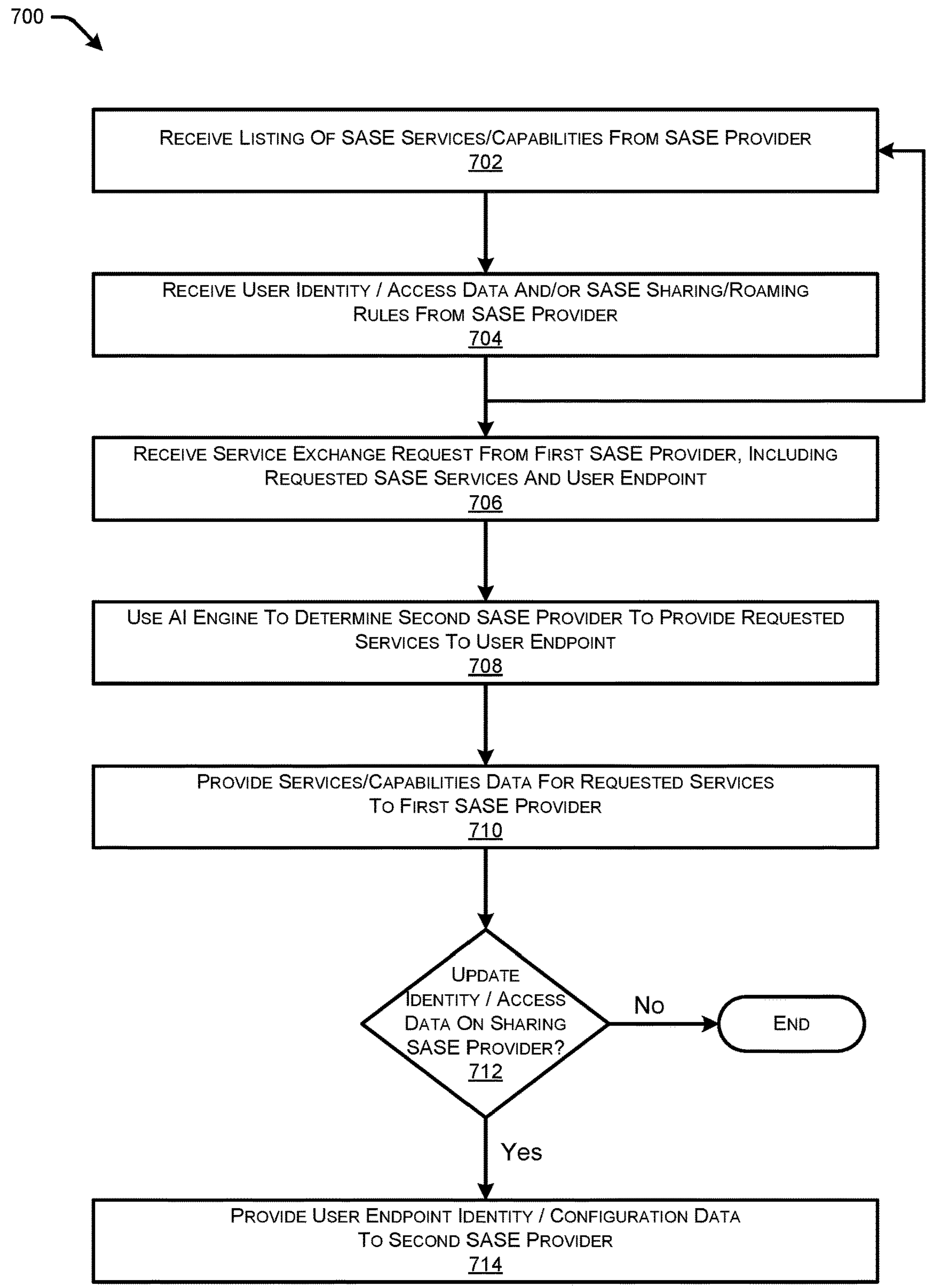
FIG. 7 is a flow diagram illustrating an example process for a SASE exchange system to receive listings of SASE services and capabilities, and handle service exchange requests from SASE providers, in accordance with one or more examples described herein.

FIG. 7 is a flow diagram of an example process 700 for a SASE exchange system to receive and respond to service exchange requests from various SASE providers, to implement sharing of SASE services and support SASE provider roaming by user endpoints. As described below, the operations in process 700 may be performed by a SASE exchange system 102 configured to receive and handle requests from SASE providers operating in various different cloud edge networks, data centers, etc. As in the above examples, the techniques described in process 700 may be applied by a system comprising one or more processors, and one or more non-transitory computer-readable media storing computer-executable instructions that, when executed by the one or more processors, cause the one or more processors to perform operations of method 700.

At operation 702, the SASE exchange system 102 may receive a listing of SASE services and/or capabilities from a SASE provider (e.g., SASE 104). For example, the SASE 104 may provide to the SASE exchange system 102 a listing of the SASE services/capabilities included in and/or provided by the SASE 104.

At operation 704, the SASE exchange system 102 may receive additional listings of user identity and/or access data from the SASE 104. Additionally or alternatively, the SASE exchange system 102 may receive sets of SASE sharing rules and/or user endpoint roaming rules from the SASE 104. For example, the SASE 104 may provide the SASE exchange system 102 with user identity and/or access data, including listings of the users, user endpoints, and/or applications that are associated with (e.g., registered with) the SASE 104. The SASE 104 also may provide the SASE exchange system 102 any or all configuration data that the SASE 104 uses to connect the user/user endpoint quickly and efficiently to its SASE services/capabilities.

Additionally or alternatively, in operation 704, the SASE 104 may provide the SASE exchange system 102 with a number of SASE service sharing and/or SASE roaming rules. For instance, SASE roaming rules for a SASE 104 may include various listings of other SASE providers, users, user endpoints, applications, and/or circumstances (e.g., times, days, current network conditions, computing environment performance, etc.) under which the SASE 104 may allow users to roam by sharing services from other SASE providers. SASE sharing rules received from the SASE 104 may include listings of other SASE providers, users, user endpoints, applications, sharing circumstances, etc., under which the SASE 104 may allow its own services/capabilities to be shared by other SASE providers to their roaming users. Further, as discussed above, in some examples the SASE 104 may provide additional sharing/roaming preferences to the SASE exchange system 102.

As discussed herein, operations 702-704 can be performed any number of times, during which the SASE exchange system 102 may be received the SASE services/capabilities, user identity/access data, sharing/roaming rules, etc., from any number of SASE providers (e.g., SASE 104, SASE 106, . . . , etc.). As described herein, the various data received from the SASE providers in operations 702 and 704 may be stored in the data repositories of the SASE exchange system 102.

At operation 706, the SASE exchange system 102 may receive a service exchange request from a SASE provider. As discussed above, service exchange requests may be received from any number of SASE providers, which may include SASE providers from which SASE sharing data was received in operations 702-704, and/or additional SASE providers that did not provide any SASE sharing/roaming information (e.g., SASE services/capabilities, user identity/access data, sharing/roaming rules, etc.) to the SASE exchange system 102. A service exchange request may correspond to a request from a user endpoint 202 to open a secure application and/or attempting to access secure resources 214 (e.g., a corporate network, internal web pages, and/or other network-based resources of an organization). The service exchange request received by the SASE exchange system 102 may identify the SASE services/capabilities that the requesting SASE is unable to provide to a user endpoint. In some examples, the service exchange request also may identify the particular user endpoint 202 and/or the particular secure resources 214 that the user endpoint 202 is attempting to access, via the SASE.

At operation 708, the SASE exchange system 102 may use one or more components configured to determine a second SASE provider (e.g., SASE 106) to provide the requested SASE services/capabilities. As described above, the SASE exchange system 102 may include an AI engine (and/or other components) configured to select the second SASE provider (e.g., SASE 106) as a possible and/or optimal SASE provider for sharing the requested SASE services. For example, the AI engine 302 may perform a cost-based optimization based on the various rules and preferences of the different SASE providers, user endpoints, resources, etc., which may be stored in the data repositories of the SASE exchange system 102.

At operation 710, the SASE exchange system 102 may provide a response to the requesting SASE 104, including data identifying and/or associated with the requested SASE services/capabilities. For instance, the SASE exchange system 102 may transmit to the SASE 104 an IP address and/or other identifying information for the second SASE 106 from which the SASE services/capabilities may be shared. Additionally, the SASE exchange system 102 may provide any of the configuration data described herein, to allow the requesting SASE 104 and/or the user endpoint 202 to quickly access the second SASE 106. Although not shown in this example, the SASE exchange system 102 may alternatively transmit a rejection in response to the request from the SASE 104, for example, if the AI engine 302 does not determine any other SASE providers capable of sharing the requested SASE services/capabilities (e.g., or having costs of a potential sharing arrangement greater than a cost threshold).

At operation 712, the SASE exchange system 102 may determine whether or not the identity/access data is to be updated for the second SASE 106. In some cases, when providing the first SASE 104 (which will provide the user endpoint 202) the address and/or credential access the second SASE 106, the user identity/access data of the second SASE 106 may be updated to allow the SASE 106 to authenticate and handle SASE requests received from the user endpoint 202. Additionally or alternatively, configuration data may be provided to allow the SASE 106 to handle quickly and efficiently handle SASE requests from the user endpoint 202 seamlessly (e.g., transparently to the user endpoint) without negatively impacting the user experience. If no such additional identity, access, and/or configuration data is needed by the sharing SASE 106 (712:No), then the sharing SASE 106 need not be contacted and the process 700 may end. However, if the sharing SASE 106 does require any additional identity data, access data, and/or configuration data to support requests from the SASE 104 and/or its user endpoints (712:Yes), then in operation 714 the SASE exchange system 102 may provide the necessary user endpoint identity/access data, configuration data, etc., to the second SASE 106, to allow it to more quickly and efficiently handle requests from the user endpoint 202 for the requested SASE services/capabilities.

Figure 8:
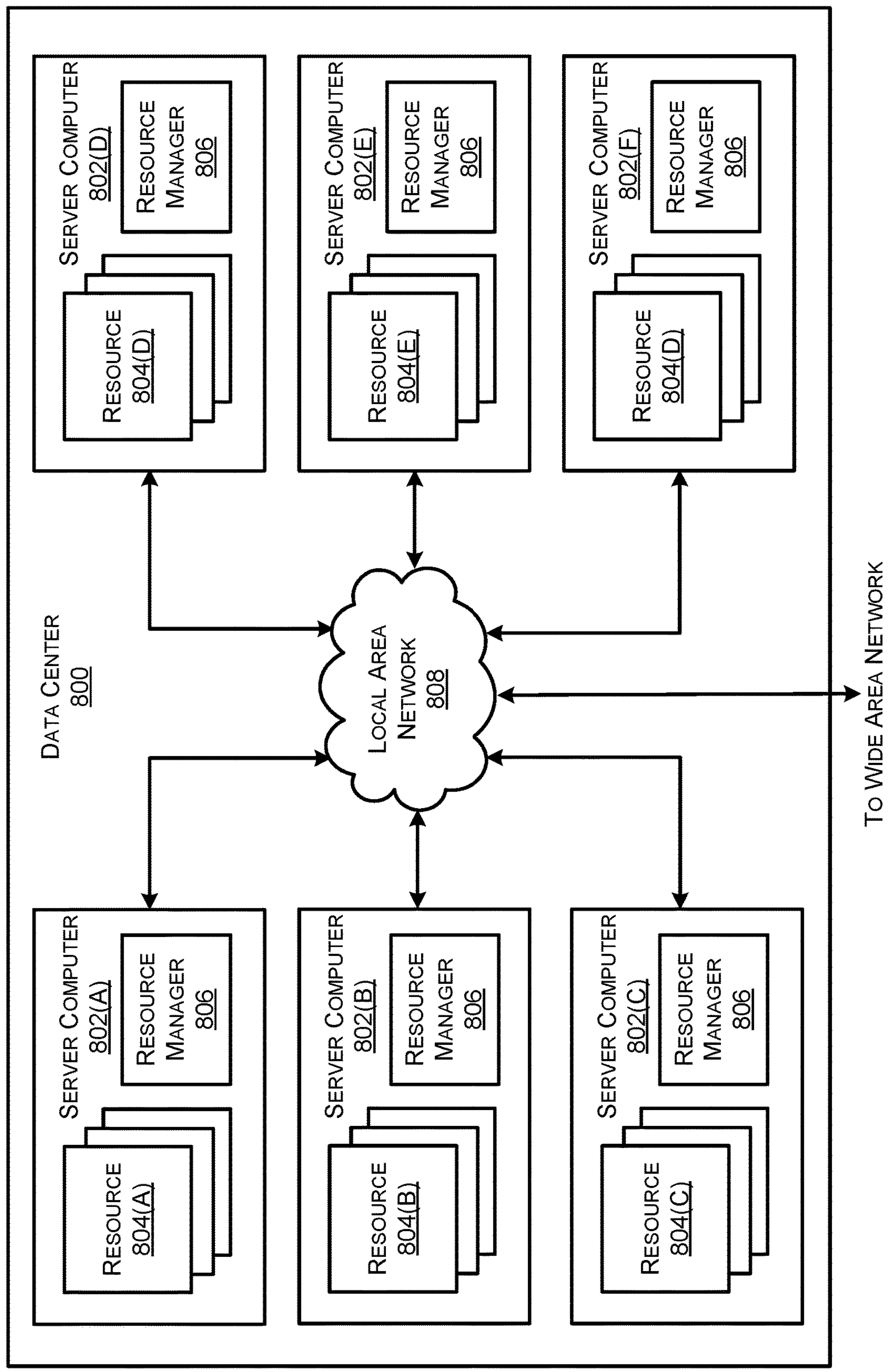
FIG. 8 illustrates a computing system diagram illustrating a configuration for a data center that may be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, any of the computing devices, systems, or components described herein. For example, a SASE exchange system 102 and/or SASE providers 104 and 106 may be implemented using one or more data center 800. Additionally or alternatively, a server computer 802 may correspond to any or all of the components of the SASE exchange system 102 described herein (e.g., an AI engine 302, SASE repository 304, identity store 306, etc.) and/or any other computing devices included in the computing environments depicted in FIGS. 1-5. Although described as server computers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single computer server 802. Server computers 802 in the data center 800 can also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized. In some examples, the server computers 802 may each execute one or more application containers and/or virtual machines to perform techniques described herein.

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations.

Figure 9:
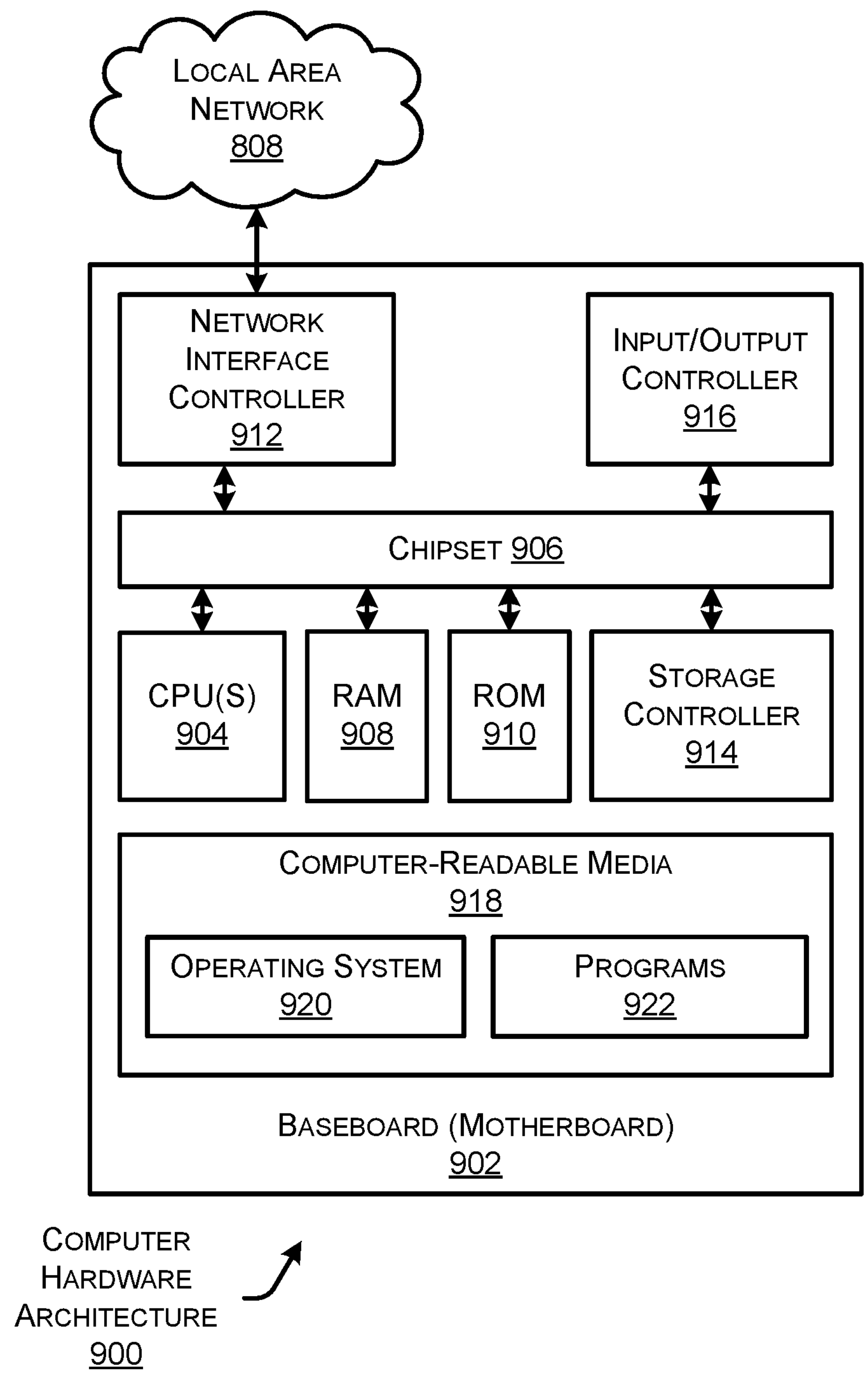
FIG. 9 illustrates a computer architecture diagram showing an example computer hardware architecture for implementing a computing device that may be utilized to implement aspects of the various technologies presented herein.

FIG. 9 shows an example computer hardware architecture 900. The computer hardware architecture 900 (which may be referred to as a computer or computer server 900) may correspond to a server computer 802 capable of executing program components for implementing the functionality described above. Additionally or alternatively, the computer architecture shown in FIG. 9 may correspond to a conventional server computer, workstation, desktop computer, laptop, tablet, network appliance, e-reader, smartphone, or other computing device, and can be utilized to execute any of the software components presented herein. In some examples, the computer server 900 shown in FIG. 9 may be used in various combinations to implement the SASE exchange system 102, a SASE provider 104 or 106, user endpoint(s) 202, and/or other systems or devices associated with the SASE exchange system 102 described herein (e.g., a private SD-WAN, a corporate SD-WAN, network devices, VPN devices, workstations, desktop computers, laptops, tablets, network appliances, etc.). Further, the computer server 900 shown in FIG. 9 may be used to execute any of the software components presented herein. Although not shown in this example, the computer server 900 may comprise network devices such as servers, switches, routers, hubs, bridges, gateways, modems, repeaters, access points, etc.

The computer server 900 may correspond to any of the computing devices, systems, or components of the SASE exchange system 102 and/or SASE providers 104 and 106 described herein. In some examples, the computer server 900 may be configured to perform, potentially in conjunction with other server computers, some or all of the operations of the SASE exchange system 102 and/or SASE providers 104 and 106.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 804 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 808. The chipset 906 can include functionality for providing network connectivity through a NIC 912, such as a gigabit Ethernet adapter. The NIC 912 is capable of connecting the computer 900 to other computing devices over the network 808. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

In some examples, the operations performed by the SASE exchange system 102, SASE providers 104-106 and/or any components included therein, may be supported by one or more devices similar to computer 900. Stated otherwise, some or all of the operations performed by the SASE exchange system 102 and or any components included therein, may be performed by one or more computer devices (e.g., computer 900) operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above in reference to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture different than that shown in FIG. 9.

As described herein, the computer 900 may comprise any of the devices described herein. The computer 900 may include one or more hardware processors 904 (processors) configured to execute one or more stored instructions. The processor(s) 904 may comprise one or more cores. Further, the computer 900 may include one or more network interfaces configured to provide communications between the computer 900 and other devices, such as the communications described herein as being performed by the SASE exchange system 102 and/or SASE providers 104 and 106. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure performed by the SASE exchange system 102, the SASE providers 104-106, user endpoints 202, and/or resources, etc. For instance, the programs 922 may cause the computer 900 to perform techniques for receiving and responding to SASE service exchange requests as described above in connection with the SASE exchange system 102, and/or for transmitting service exchange requests in response to receiving resource requests from user endpoints 202 as described above in connection with the SASE providers 104-106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:

one or more processors; and one or more non-transitory computer-readable media storing computer-executable instructions that, when executed by the one or more processors, cause the one or more processor to perform operations comprising:

receiving a service exchange request from a first secure access service edge (SASE) provider, the service exchange request including data identifying a requested SASE service and a data identifying a user endpoint;

determining, based at least in part on receiving the service exchange request, a first set of SASE service roaming rules associated with the first SASE provider, and a second set of SASE service sharing rules associated with a second SASE provider;

determining, based at least in part on the requested SASE service, the user endpoint, the first set of SASE service roaming rules, and the second set of SASE service sharing rules, the second SASE provider to provide the requested SASE service to the user endpoint;

providing, to the first SASE provider, a response to the service exchange request, the response including network address data associated with second SASE provider; and providing, to the second SASE provider, the data identifying the user endpoint.

2. The system of claim 1, wherein determining the second SASE provider to provide the requested SASE service to the user endpoint comprises:

providing, as input to an artificial intelligence (AI) engine, first input data associated with the requested SASE service, and second input associated with the user endpoint; and receiving, as output from the AI engine, output data identifying the second SASE provider.

3. The system of claim 1, the operations further comprising:

receiving, from the first SASE provider, endpoint metadata associated with the user endpoint, the endpoint metadata including at least one service preference associated with the user endpoint, wherein determining the second SASE provider is based at least in part on the endpoint metadata.

4. The system of claim 1, the operations further comprising:

receiving provider metadata associated with the second SASE provider, the provider metadata including at least one of:

a latency associated with the second SASE provider;

a bandwidth availability associated with the second SASE provider;

a service utilization associated with the second SASE provider; or a geolocation associated with the second SASE provider, wherein determining the second SASE provider is based at least in part on the provider metadata.

5. The system of claim 1, wherein providing the data identifying the user endpoint to the second SASE provider includes:

determining service configuration data associated with the first SASE provider; and providing the service configuration data to the second SASE provider.

6. The system of claim 1, the operations further comprising:

receiving, from the first SASE provider and prior to the service exchange request, a first set of security services provided by the first SASE provider, wherein the requested SASE service is not provided by the first SASE provider; and receiving, from the second SASE provider and prior to the service exchange request, a second set of security services provided by the second SASE provider, wherein the requested SASE service is provided by the second SASE provider.

7. The system of claim 6, wherein providing the response to the first SASE provider comprises:

determining, based at least in part on the first set of security services and the second set of security services, a first subset of security services to be provided to the user endpoint by the first SASE provider, and a second subset of security services to be provided to the user endpoint by the second SASE provider; and transmitting, to the first SASE provider, data identifying the second subset of security services to be provided to the user endpoint by the second SASE provider.

8. The system of claim 1, wherein determining the second SASE provider to provide the requested SASE service to the user endpoint comprises:

determining, based at least in part on the service exchange request, the second SASE provider as a home SASE provider associated with the user endpoint;

determining the first SASE provider as a current SASE provider associated with the user endpoint; and determining, based at least in part on the first set of SASE service roaming rules, that the first SASE provider permits SASE service roaming to the second SASE provider.

9. The system of claim 8, wherein providing the response to the first SASE provider comprises:

receiving, from the second SASE provider, a set of security services provided by the second SASE provider; and transmitting, to the first SASE provider, data identifying the set of security services to be provided to the user endpoint by the second SASE provider.

10. A method for providing security services to an endpoint device using a secure access service edge (SASE) provider, the method comprising:

receiving a service exchange request from a first secure access service edge (SASE) provider, the service exchange request including data identifying a requested SASE service and a data identifying an endpoint device;

determining, based at least in part on receiving the service exchange request, a first set of SASE service roaming rules associated with the first SASE provider, and a second set of SASE service sharing rules associated with a second SASE provider;

determining, based at least in part on the requested SASE service, the endpoint device, the first set of SASE service roaming rules, and the second set of SASE service sharing rules, the second SASE provider to provide the requested SASE service to the endpoint device;

providing, to the first SASE provider, a response to the service exchange request, the response including network address data associated with second SASE provider; and providing, to the second SASE provider, the data identifying the endpoint device.

11. The method of claim 10, wherein determining the second SASE provider to provide the requested SASE service to the endpoint device comprises:

providing, as input to an artificial intelligence (AI) engine, first input data associated with the requested SASE service, and second input associated with the endpoint device; and receiving, as output from the AI engine, output data identifying the second SASE provider.

12. The method of claim 10, further comprising:

receiving, from the first SASE provider, endpoint metadata associated with the endpoint device, the endpoint metadata including at least one service preference associated with the endpoint device, wherein determining the second SASE provider is based at least in part on the endpoint metadata.

13. The method of claim 10, further comprising:

receiving provider metadata associated with the second SASE provider, the provider metadata including at least one of:

a latency associated with the second SASE provider;

a bandwidth availability associated with the second SASE provider;

a service utilization associated with the second SASE provider; or a geolocation associated with the second SASE provider, wherein determining the second SASE provider is based at least in part on the provider metadata.

14. The method of claim 10, wherein providing the data identifying the endpoint device to the second SASE provider includes:

determining service configuration data associated with the first SASE provider; and providing the service configuration data to the second SASE provider.

15. The method of claim 10, further comprising:

receiving, from the first SASE provider and prior to the service exchange request, a first set of security services provided by the first SASE provider, wherein the requested SASE service is not provided by the first SASE provider; and receiving, from the second SASE provider and prior to the service exchange request, a second set of security services provided by the second SASE provider, wherein the requested SASE service is provided by the second SASE provider.

16. One or more non-transitory computer-readable media storing computer-executable instructions that, when executed by one or more processors, cause the one or more processors to perform operations comprising:

receiving, by a first secure access service edge (SASE) provider and from an endpoint device, a request to utilize a security service;

determining that the security service is not provided by the first SASE provider;

transmitting, by the first SASE provider, a request to a SASE exchange system, the request including data identifying the security service and the endpoint device;

receiving, by the first SASE provider, a response from the SASE exchange system, the response including a network address associated with a second SASE provider capable of providing the security service; and providing the network address to the endpoint device, in response to the request to utilize the security service.

17. The one or more non-transitory computer-readable media of claim 16, the operations further comprising:

receiving, from the endpoint device, endpoint metadata including at least one service preference associated with the security service, wherein transmitting the request to the SASE exchange system includes transmitting the endpoint metadata.

18. The one or more non-transitory computer-readable media of claim 16, the operations further comprising:

receiving, in response to the request to the SASE exchange system, a listing of a plurality of security services, including the security service, that the second SASE provider is capable of providing to the endpoint device; and providing the listing of the plurality of security services to the endpoint device.

19. The one or more non-transitory computer-readable media of claim 16, the operations further comprising:

transmitting, to the SASE exchange system and prior to the request to the SASE exchange system, a first set of security services provided by the first SASE provider, wherein the security service is not provided by the first SASE provider.

20. The one or more non-transitory computer-readable media of claim 16, the operations further comprising:

transmitting, to the SASE exchange system and prior to the request to the SASE exchange system, a first set of SASE service roaming rules associated with the first SASE provider, and a second set of SASE service sharing rules associated with a first SASE provider.

* * * * *